(12) United States Patent
Kounavis et al.

(10) Patent No.: US 7,408,932 B2
(45) Date of Patent: Aug. 5, 2008

(54) METHOD AND APPARATUS FOR TWO-STAGE PACKET CLASSIFICATION USING MOST SPECIFIC FILTER MATCHING AND TRANSPORT LEVEL SHARING

(75) Inventors: Michael E. Kounavis, New York, NY (US); Alok Kumar, Santa Clara, CA (US); Raj Yavatkar, Portland, OR (US); Harrick M. Vin, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 1193 days.

(21) Appl. No.: 10/690,301

(22) Filed: Oct. 20, 2003

(65) Prior Publication Data

US 2005/0083935 A1   Apr. 21, 2005

(51) Int. Cl.
*H04L 12/56* (2006.01)
*H04L 29/06* (2006.01)
*G06F 15/16* (2006.01)

(52) U.S. Cl. ............ 370/392; 389/395.3; 389/400; 709/230

(58) Field of Classification Search ............ 370/386, 370/389, 392, 400, 395.3, 395.4, 401, 412; 709/227–230; 713/154, 164
See application file for complete search history.

(56) References Cited

U.S. PATENT DOCUMENTS

| | | | |
|---|---|---|---|
| 6,147,976 A | 11/2000 | Shand et al. | |
| 6,185,568 B1 | 2/2001 | Douceur et al. | |
| 6,252,872 B1 | 6/2001 | Tzeng | |
| 6,289,013 B1 | 9/2001 | Lakshman et al. | |
| 6,301,669 B2 | 10/2001 | Boden et al. | |
| 6,341,130 B1 | 1/2002 | Lakshman et al. | |
| 6,529,508 B1 | 3/2003 | Li et al. | |
| 6,567,408 B1 | 5/2003 | Li et al. | |
| 6,587,466 B1 | 7/2003 | Bhattacharya et al. | |
| 2002/0126621 A1 | 9/2002 | Johnson et al. | |
| 2002/0165949 A1 | 11/2002 | Na et al. | |
| 2002/0191605 A1 | 12/2002 | Lunteren et al. | |
| 2003/0051165 A1 | 3/2003 | Krishnan et al | |
| 2003/0053448 A1 | 3/2003 | Craig et al. | |

(Continued)

FOREIGN PATENT DOCUMENTS

WO    WO 03/021906 A1    3/2003

OTHER PUBLICATIONS

PCT/US2004/0342246, filed May 4, 2005, PCT International Search Report and Written Opinion.

(Continued)

*Primary Examiner*—Afsar M. Qureshi
(74) *Attorney, Agent, or Firm*—Blakely, Sokoloff, Taylor & Zafman LLP

(57) ABSTRACT

A method and apparatus for two-stage packet classification, the two-stage packet classification scheme including a first stage and a second stage. In the first classification stage, a packet is classified on the basis of the packet's network path. In the second stage of classification, the packet is classified on the basis of one or more transport (or other) fields of the packet. Also disclosed are embodiments of most specific filter matching and transport level sharing, and either one or both of these techniques may be implemented in the two-stage classification method.

27 Claims, 25 Drawing Sheets

U.S. PATENT DOCUMENTS

2003/0074458 A1    4/2003    Gokhale
2003/0123386 A1    7/2003    Yang

OTHER PUBLICATIONS

PCT/US2004/034246, PCT International Preliminary Report On Patentability, Apr. 24, 2006.

M.E. Kounavis, et al., "Directions in Packet Classification for Network Processors", Second Workshop on Network Processors(NP2), Anahein, CA, Feb. 2003, pp. 1-10.

P.F. Tsuchiya, "A Search Algorithm for Table Entries With Non-Contiguous Wildcarding", Bellcore, 1991, pp. 1-10.

Degermark, et al., "Small Forwarding Tables for Fast Routing Lookups", Computer Communication Review, acm sigcomm, vol. 27, No. 4, Oct. 1997, 16 Pgs.

Shafai, et al., "Fully Parallel 30-MHz, 2.5-Mb CAM", IEEE Journal of Solid-State Circuits, vol. 33, No. 11, Nov. 1998, 9 Pgs.

Srinivasan, et al., "Fast and Scalable Layer Four Switching", Computer Communication Review, acm sigcomm, vol. 28, No. 4, Oct. 1998, 14 Pgs.

Lakshman, et al., "High-Speed Policy-Based Packet Forwarding Using Efficient Multi-Dimensional Range Matching", Computer Communicaiton Review, acm sigcomm, vol. 28, No. 4, Oct. 1998, 14 Pgs.

Buddhikot, et al., "Space Decomposition Techniques for Fast Layer-4 Switching", IEEE ComSoc TC on Gigabit Networking Sixth International Workshop on Protocals for High-Speed Networks (PfHSN 99), 1999, 12 Pgs.

Gupta, et al., "Packet Classification on Multiple Fields", Computer Communication Review, acm sigcomm, vol. 29, No. 4, Oct. 1999, 16 Pgs.

Srinivasan, et al., "Packet Classification Using Tuple Space Search", Computer Communication Review, acm sigcomm, vol. 29, No. 4, Oct. 1999, 14 Pgs.

Gupta, et al., "Classifying Packets With Hierarchical Intelligent Cuttings", IEEE Micro Chips, Systems, Software, and Applications, Jan./Feb. 2000, 10 Pgs.

Hari, et al., "Detecting and Resolving Packet Filter Conflicts", IEEE Infocom 2000, The Conference on Computer Communications, vol. 3, 12 Pgs.

Feldmann, et al., "Tradeoffs for Packet Classification", IEEE Infocom 2000, The Conference on Computer Communications, vol. 3, 12 Pgs.

Baboescu, et al., "Scalable Packet Classification", Computer Communication Review, acm sigcomm, vol. 31, No. 4, Oct. 2001, 14 Pgs.

Prakash, et al., "QC-3072 Packet Classification Using BDDs and Pipelined SRAMs", Hot Interconnects 9, Symposium on High Performance Interconnects, IEEE Computer Society, 2001, 8 Pgs.

Gupta, et al., "Algorithms for Packet Classification", IEEE Network, The Magazine of Global Internetworking, Mar./Apr. 2001, vol. 15, No. 2, 11 Pgs.

Baboescu, et al., "Packet Classification for Core Routers: Is There an Alternative to CAMs?", IEEE Infocom 2003, 11 Pgs.

| SRC ADD | DST ADD | PRTCL | SRC PORT | DST PORT | ACTION | AB. PR. | REL. PR. |
|---|---|---|---|---|---|---|---|
| ⋮ | ⋮ | ⋮ | ⋮ | ⋮ | ⋮ | ⋮ | ⋮ |
| 128.128.10.5 | 172.128.* | TCP | 21 | * | ACCEPT | 12 | 1 |
| 128.128.10.5 | 172.128.* | TCP | 80 | * | ACCEPT | 13 | 2 |
| 128.128.10.5 | 172.128.* | TCP | 17 | * | BLOCK | 14 | 3 |
| 128.128.10.7 | 172.128.* | TCP | 21 | * | ACCEPT | 15 | 1 |
| 128.128.10.7 | 172.128.* | TCP | 80 | * | ACCEPT | 16 | 2 |
| 128.128.10.7 | 172.128.* | TCP | 17 | * | BLOCK | 17 | 3 |
| ⋮ | ⋮ | ⋮ | ⋮ | ⋮ | ⋮ | ⋮ | ⋮ |

FIG. 8

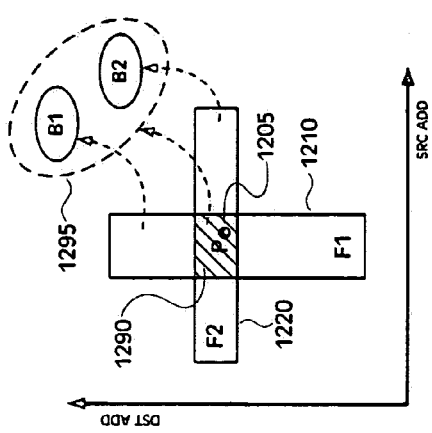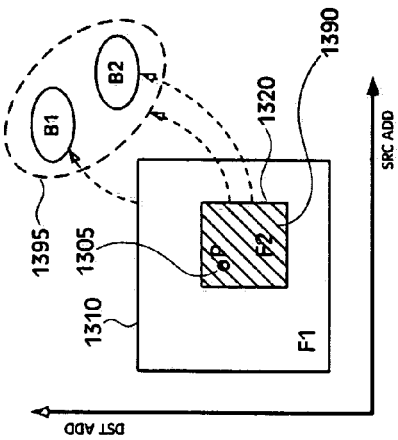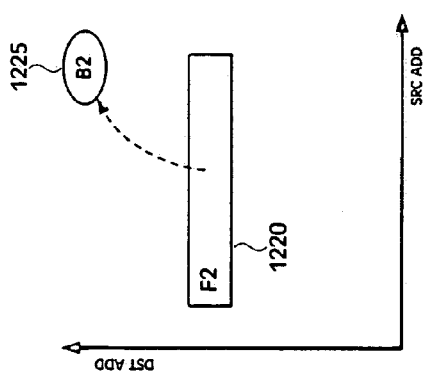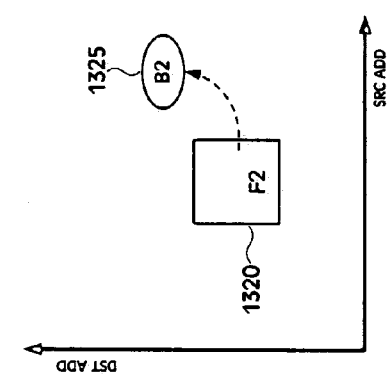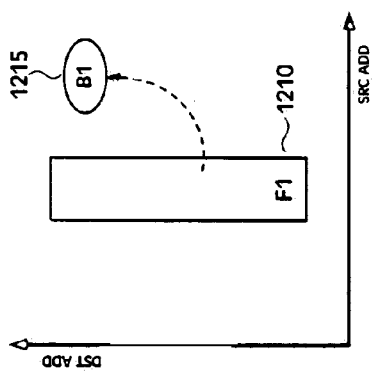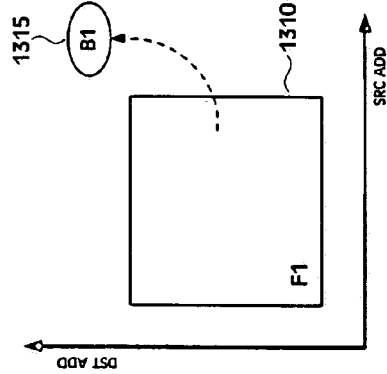
FIG. 12A  FIG. 12B  FIG. 12C
FIG. 13A  FIG. 13B  FIG. 13C

METHOD AND APPARATUS FOR TWO-STAGE PACKET CLASSIFICATION USING MOST SPECIFIC FILTER MATCHING AND TRANSPORT LEVEL SHARING

FIELD OF THE INVENTION

The invention relates generally to computer networking and, more particularly, to a method and apparatus for classifying packets.

BACKGROUND OF THE INVENTION

Traditionally, packet routing in computer networks is based solely on the destination address of a packet. This routing technique is generally associated with "best effort" delivery, and all traffic going to the same address is treated identically. However, packet routing based on destination address alone is insufficient to meet growing demands for greater bandwidth, enhanced security, and increased flexibility and service differentiation. To meet these objectives, equipment vendors and service providers are providing more discriminating forms of routing, including routing through firewalls, quality of service (QoS) based forwarding, and bandwidth and/or resource reservation.

Generally, a firewall comprises any component, or combination of components, capable of blocking certain classes of traffic (e.g., "unwanted" or "suspicious" traffic). Firewalls are often utilized in corporate networks and other enterprise networks, and the firewall is usually implemented at the entry and/or exit points—i.e., the "trust boundary"—of the network. A typical firewall includes a series of rules or filters that are designed to carry out a desired security policy.

Network service providers may have a wide array of customers, each requiring different services, service priorities, and pricing. To provide differentiated services to a number of different customers—or, more generally, to provide preferential treatment to certain classes of network traffic—equipment vendors have implemented a variety of mechanisms, including QoS based forwarding and bandwidth/resource reservation. The goal of QoS based forwarding is to provide service differentiation for a number of different customers and/or traffic types. QoS based forwarding may include, for example, forwarding based upon class of service, special queuing procedures (e.g., per-flow queuing), and fair scheduling methods. Integrally tied with QoS forwarding is bandwidth or resource reservation. Bandwidth reservation generally includes reserving a specified bandwidth for certain types of traffic. For example, bandwidth reservation may be applied to traffic between two points, or bandwidth reservation may be applied to traffic relating to a certain application (e.g., multimedia, video, etc.).

To implement the above-described routing methodologies (e.g., firewalls, QoS forwarding, bandwidth reservation) that provide more discriminating routing of network traffic, as well as to perform other policy-based packet forwarding techniques, it is necessary to classify packets. Generally, packet classification comprises distinguishing between packets belonging to different flows or between packets associated with different traffic types. As used herein, a "flow" is a series of packets that share at least some common header characteristics (e.g., packets flowing between two specific addresses). A packet is usually classified based upon one or more fields in the packet's header. One or more rules are applied to this header information to determine which flow the packet corresponds with or what type of traffic the packet is associated with.

A packet classification rule generally includes several fields that are compared against a number of corresponding fields in the header of a received packet, as well as an associated priority and action. The set of rules making up a classification database may be arranged into a prioritized list, and rules with higher priority are preferred over those with lower priority. When a packet is received, the contents of the packet (e.g., certain header fields) are compared with each rule in the classification database to determine the highest priority action that is to be applied to the packet.

A number of methods—both hardware and software implementations—for performing packet classification based upon header data are known in the art, including hashing schemes, bit parallelism techniques, and implementations utilizing content addressable memory (CAM). Hashing methods create groups of rules according to bit masks used in each field of the rules, each group of rules represented by a hash table (or tables). Identifying a rule matching a received packet requires a series of look-ups on the hash tables.

Bit parallelism splits an n-dimensional classification problem into multiple stages of a single dimension each. Each match in a single dimension returns a bit vector. The bit vector has a length equal to the number of rules stored in the system, and a bit in the bit vector is set if the rule corresponding to that bit specifies a range of values matching the appropriate field of the received packet. The rules that have their bits set in all returned bit vectors match the received packet. An improvement over the standard bit parallelism scheme is the aggregated bit vector (ABV) method. For the ABV method, each "full" bit vector is compressed and represented as a smaller size set of bits (called an "aggregated bit vector"). Each bit in the aggregated bit vector represents a group of bits from the full bit vector, and a bit in the aggregated bit vector is set if a least one bit among the associated group of bits (in the full bit vector) is set.

For CAM implementations, each entry of a CAM is associated with a value and a bit mask. The value includes one or more fields of a rule, and the bit mask specifies which bits of a search key are taken into account when the key is compared against the value. The CAM unit—which may be capable of simultaneously comparing the search key against multiple entries—returns an index associated with a highest priority matching entry, and this index is used for identifying the action for the packet.

A number of factors may impact the performance of the above-described classification schemes, including a high number of required memory accesses, large storage requirements, and (at least for CAM implementations) significant power dissipation. Because of the bandwidth and memory overhead, as well as other factors, these packet classification techniques may struggle to keep pace with advances in link speeds as well as growth in classification database sizes, and packet classification can be the bottleneck in routers supporting high speed links (e.g., gigabit capacity).

BRIEF DESCRIPTION OF THE DRAWINGS

FIG. 8 is a schematic diagram illustrating a portion of an exemplary classification database.

FIGS. 12A-12C are schematic diagrams illustrating an embodiment of two partially overlapping filters.

FIGS. 13A-13C are schematic diagram illustrating an embodiment of two completely overlapping filters.

DETAILED DESCRIPTION OF THE INVENTION

Embodiments of a packet classifier are disclosed herein. The disclosed embodiments of the packet classifier are described below in the context of a router implementing a packet forwarder (e.g., a firewall, a QoS based forwarder, etc.). However, it should be understood that the disclosed embodiments are not so limited in application and, further, that the embodiments of a packet classifier described in the following text and figures are generally applicable to any device, system, and/or circumstance where classification of packets or other communications is needed.

Figure 1:
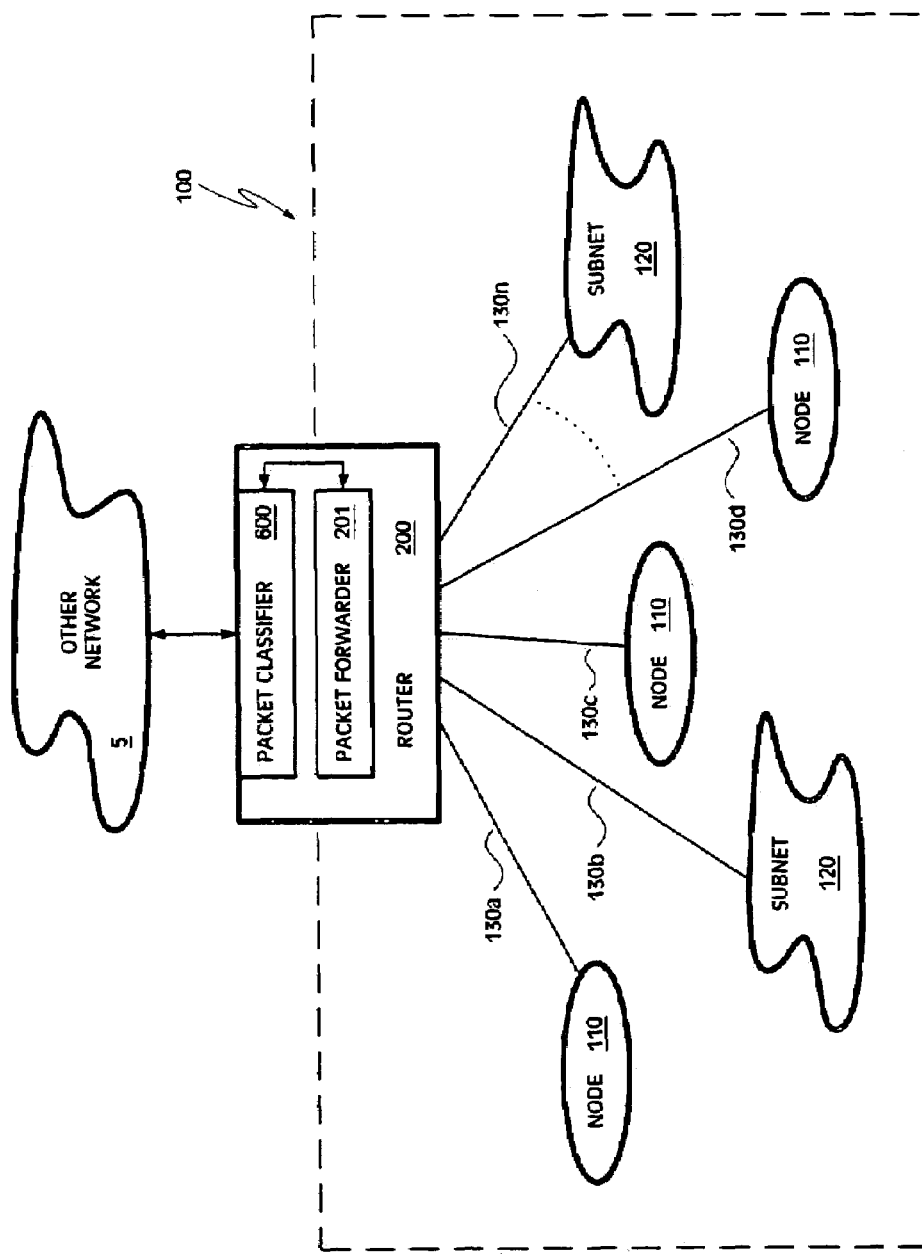
FIG. 1 is a schematic diagram illustrating an embodiment of a network having a router.

Illustrated in FIG. 1 is an embodiment of a network 100. The network 100 includes a router 200 having a packet forwarder 201. The router 200 (and packet forwarder 201) may implement a specified security policy, QoS forwarding, and/or or resource reservation, as well as any other desired policy-based forwarding scheme. To discriminate between packets belonging to different flows and/or between packets associated with different traffic types, the router 200 also includes a packet classifier 600, which includes a set of rules designed to implement desired forwarding policies. Embodiments of the packet classifier 600 are described below in greater detail. The router 200 (as well as packet forwarder 201 and packet classifier 600) may be implemented on any suitable computing system or device (or combination of devices), and one embodiment of the router 200 is described below with respect to FIG. 2 and the accompanying text. It should be understood that the router 200 may include other components (e.g., a scheduler, a traffic manager, etc.), which components have been omitted from FIG. 1 for clarity and ease of understanding.

The router 200 is coupled via a plurality of links 130—including links 130a, 130b, . . . , 130n—with a number of nodes 110 and/or a number of subnets 120. A node 110 comprises any addressable device. For example, a node 110 may comprise a computer system or other computing device, such as a server, a desktop computer, a laptop computer, or a hand-held computing device (e.g., a personal digital assistant or PDA). A subnet 120 may comprise a collection of other nodes, and a subnet 120 may also include other routers or switches. Each of the links 130a-n may be established over any suitable medium—e.g., wireless, copper wire, fiber optic, or a combination thereof—supporting the exchange of information via any suitable protocol—e.g., TCP/IP (Transmission Control Protocol/Internet Protocol), HTTP (Hyper-Text Transmission Protocol), as well as others.

The network 100 may comprise any type of network, such as a Local Area Network (LAN), a Metropolitan Area Network (MAN), a Wide Area Network (WAN), a Wireless LAN (WLAN), or other network. The router 200 also couples the network 100 with another network (or networks) 5, such as, by way of example, the Internet and/or another LAN, MAN, LAN, or WLAN. Router 200 may be coupled with the other network 5 via any suitable medium, including a wireless, copper wire, and/or fiber optic connection using any suitable protocol (e.g., TCP/IP, HTTP, etc.).

It should be understood that the network 100 shown in FIG. 1 is intended to represent an exemplary embodiment of such a system and, further, that the network 100 may have any suitable configuration. For example, the network 100 may include additional nodes 110, subnets 120, and/or other devices (e.g., switches, routers, hubs, etc.), which have been omitted from FIG. 1 for ease of understanding. Further, it should be understood that the network 100 may not include all of the components illustrated in FIG. 1.

In one embodiment, the router 200 comprises any suitable computing device upon which the packet classifier 600 can be implemented (in hardware, software, or a combination of hardware and software). An embodiment of such a computing system is illustrated in FIG. 2.

Figure 2:
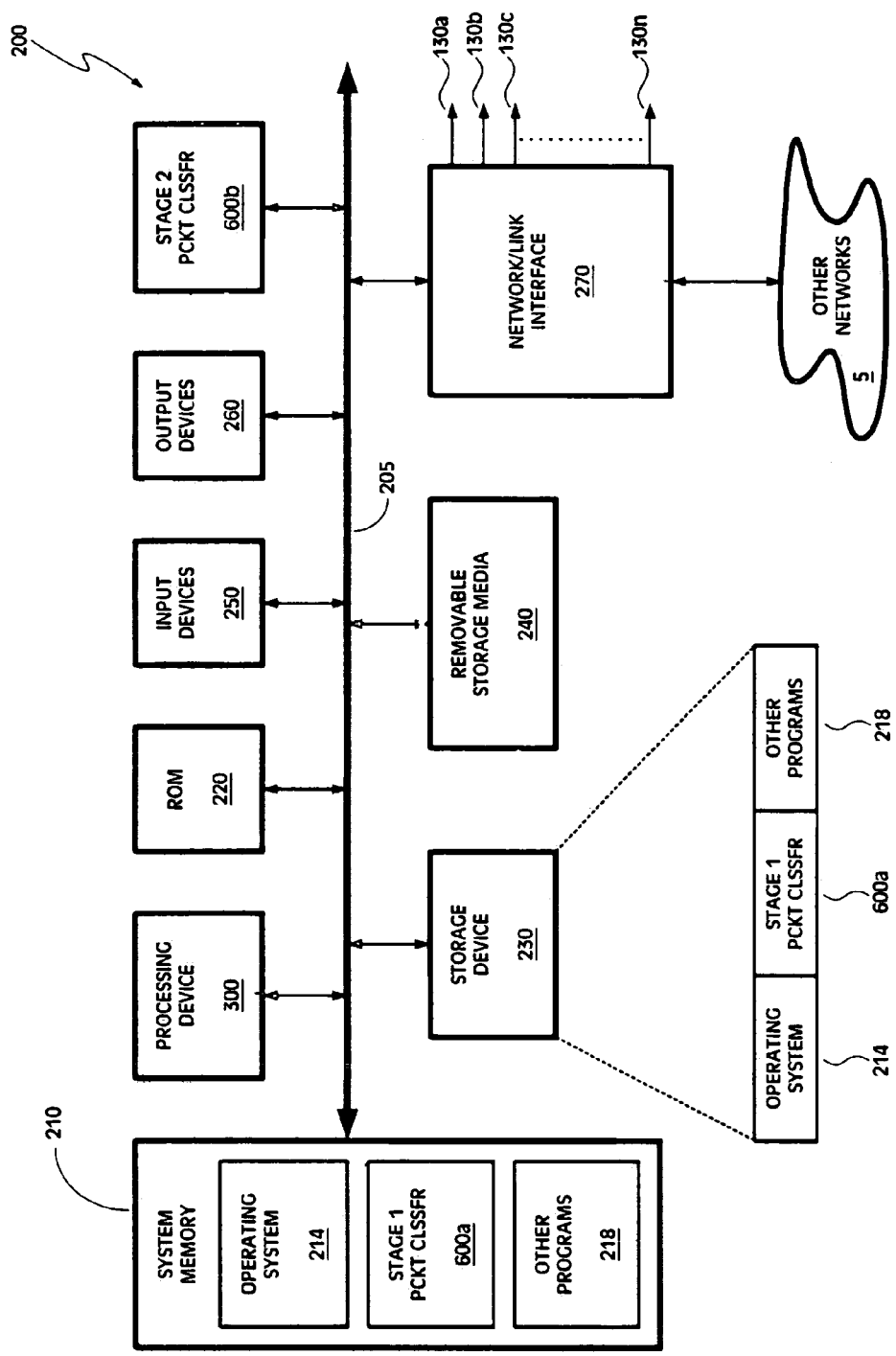
FIG. 2 is a schematic diagram illustrating an embodiment of the router shown in FIG. 1.

Referring to FIG. 2, the router 200 includes a bus 205 to which various components are coupled. Bus 205 is intended to represent a collection of one or more buses—e.g., a system bus, a Peripheral Component Interface (PCI) bus, a Small Computer System Interface (SCSI) bus, etc.—that interconnect the components of router 200. Representation of these buses as a single bus 205 is provided for ease of understanding, and it should be understood that the router 200 is not so limited. Those of ordinary skill in the art will appreciate that the router 200 may have any suitable bus architecture and may include any number and combination of buses.

Coupled with bus 205 is a processing device (or devices) 300. The processing device 300 may comprise any suitable processing device or system, including a microprocessor, a network processor, an application specific integrated circuit (ASIC), or a field programmable gate array (FPGA), or similar device. An embodiment of the processing device 300 is illustrated below in FIG. 3 and the accompanying text. It should be understood that, although FIG. 2 shows a single processing device 300, the router 200 may include two or more processing devices.

Router 200 also includes system memory 210 coupled with bus 205, the system memory 210 comprising, for example, any suitable type and number of random access memories, such as static random access memory (SRAM), dynamic random access memory (DRAM), synchronous DRAM (SDRAM), or double data rate DRAM (DDRDRAM). During operation of router 200, an operating system (or set of operating systems) 214, the packet classifier 600, as well as other programs 218 may be resident in the system memory 210. In the embodiment of FIG. 2, as will be described below, a portion of the packet classifier—i.e., a first stage 600a (STAGE 1 PCKT CLSSFR) of the packet classifier—comprises a set of software routines, which may be resident in the system memory 210, whereas another portion of the packet classifier—i.e., a second stage 600b (STAGE 2 PCKT CLSSFR) of the packet classifier—is implemented in hardware. It should be understood, however, that the embodiment of FIG. 2 represents but one implementation of the disclosed packet classifier and, further, that the disclosed packet classifier may be implemented in any other suitable software and/or hardware configuration. For example, in another embodiment, the second classification stage 600b may also be implemented in software, in which case the second stage 600b may comprise a set of software routines resident in system memory 210 (and, perhaps, stored in storage device 230).

Router 200 may further include a read-only memory (ROM) 220 coupled with the bus 205. During operation, the ROM 220 may store temporary instructions and variables for processing device 300. The router 200 may also include a storage device (or devices) 230 coupled with the bus 205. The storage device 230 comprises any suitable non-volatile memory, such as, for example, a harddisk drive. The packet classifier 600 (e.g., the first stage 600a of packet classifier 600), as well as operating system 214 and other programs 218 (e.g., a software implementation of packet forwarder 201), may be stored in the storage device 230. Further, a device 240 for accessing removable storage media (e.g., a floppy disk drive or a CD ROM drive) may be coupled with bus 205.

The router 200 may include one or more input devices 250 coupled with the bus 205. Common input devices 250 include keyboards, pointing devices such as a mouse, and as well as other data entry devices. One or more output devices 260 may also be coupled with the bus 205. Common output devices 260 include video displays, printing devices, audio output devices, and status indicators (e.g., LEDs).

The router 200 further comprises a network/link interface 270 coupled with bus 205. The network/link interface 270 comprises any suitable hardware, software, or combination of hardware and software that is capable of coupling the router 200 with the other network (or networks) 5 and, further, that is capable of coupling the router 200 with each of the links 130a-n.

It should be understood that the router 200 illustrated in FIG. 2 is intended to represent an exemplary embodiment of such a device and, further, that this system may include many additional components, which have been omitted for clarity and ease of understanding. By way of example, the router 200 may include a DMA (direct memory access) controller, a chip set associated with the processing device 300, additional memory (e.g., a cache memory), as well as additional signal lines and buses. Also, it should be understood that the router 200 may not include all of the components shown in FIG. 2.

In one embodiment, the packet classifier 600, or a portion of the packet classifier, comprises a set of instructions (i.e., a software application) run on a computing device—e.g., the router 200 of FIG. 2 or other suitable computing device. The set of instructions may be stored locally in storage device 230 (or other suitable program memory). Alternatively, the instructions may be stored in a remote storage device (not shown in figures) and accessed via network 100 (or from another network 5). During operation, the set of instructions may be executed on processing device 300, wherein the instructions (or a portion thereof) may be resident in system memory 210.

In another embodiment, the packet classifier 600 (or a portion of the packet classifier) comprises a set of instructions stored on a machine accessible medium, such as, for example, a magnetic media (e.g., a floppy disk or magnetic tape), an optically accessible disk (e.g., a CD-ROM disk), a flash memory device, etc. To run packet classifier 600 on, for example, the router 200 of FIG. 2, the device 240 for accessing removable storage media may access the instructions on the machine accessible medium, and the instructions may then be executed in processing device 300. In this embodiment, the instructions (or a portion thereof) may again be downloaded to system memory 210.

In a further embodiment, the packet classifier 600, or a portion of the packet classifier, is implemented in hardware. For example, the packet classifier 600 (or a portion thereof) may be implemented using a content addressable memory (CAM). In yet a further embodiment, the packet classifier 600 may be implemented using a combination of software and hardware.

In one particular embodiment, which will be described below in more detail, the packet classifier 600 comprises a two-stage packet classification system, and this two-stage classification scheme may be implemented in both hardware and software. The two-stage packet classifier comprises a first stage 600a and a second stage 600b (see FIG. 2). In one embodiment, the first stage 600a is implemented in software, and the second stage 600b is implemented in hardware.

Figure 3:
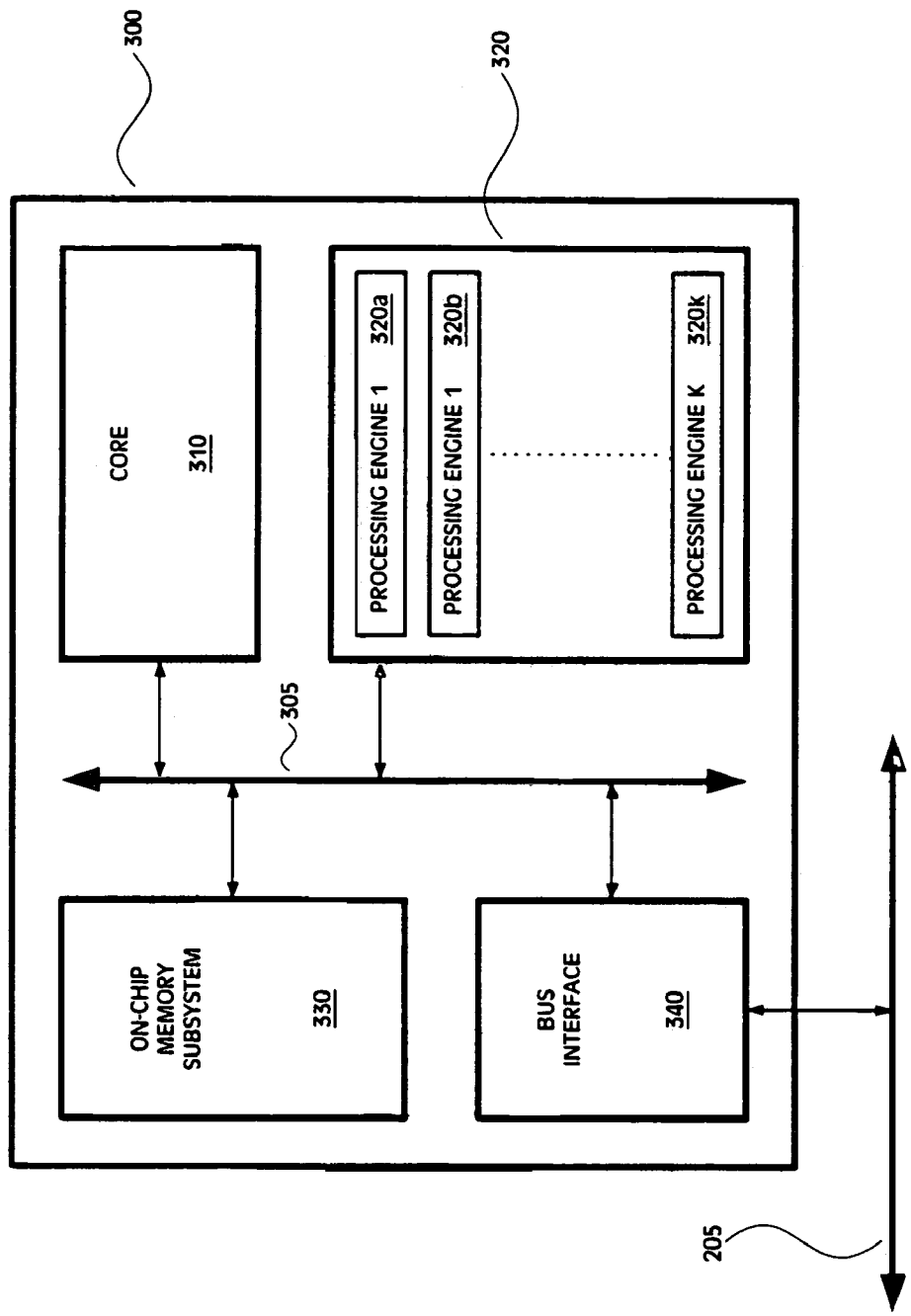
FIG. 3 is a schematic diagram illustrating an embodiment of a processing device shown in FIG. 2.

As previously noted, an embodiment of processing device 300 is illustrated in FIG. 3 and the accompanying text. It should be understood, however, that the processing device 300 shown in FIG. 3 is but one embodiment of a processing device upon which the disclosed embodiments of a packet classifier 600 may be implemented. Those of ordinary skill in the art will appreciate that the disclosed embodiments of packet classifier 600 may be implemented on many other types of processing systems and/or processor architectures.

Turning now to FIG. 3, the processing device 300 includes a local bus 305 to which various functional units are coupled. Bus 305 is intended to represent a collection of one or more on-chip buses that interconnect the various functional units of processing device 300. Representation of these local buses as a single bus 305 is provided for ease of understanding, and it should be understood that the processing device 300 is not so limited. Those of ordinary skill in the art will appreciate that the processing device 300 may have any suitable bus architecture and may include any number and combination of buses.

A core 310 and a number of processing engines 320 (e.g., processing engines 320a, 320b, . . . , 320k) are coupled with the local bus 305. In one embodiment, the core 310 comprises a general purpose processing system, which may execute operating system 214. Core 310 may also control operation of processing device 300 and perform a variety of management functions, such as dispensing instructions to the processing engines 320 for execution. Each of the processing engines 320a-k comprises any suitable processing system, and each may include an arithmetic and logic unit (ALU), a controller, and a number of registers (for storing data during read/write operations). Also, in one embodiment, each processing engine 320a-k provides for multiple threads of execution (e.g., four).

Also coupled with the local bus 305 is an on-chip memory subsystem 330. Although depicted as a single unit, it should be understood that the on-chip memory subsystem 330 may—and, in practice, likely does—comprise a number of distinct memory units and/or memory types. For example, such on-chip memory may include SDRAM, SRAM, and/or flash memory (e.g., FlashROM). It should be understood that, in addition to on-chip memory, the processing device 300 may be coupled with off-chip memory (e.g., ROM 220, off-chip cache memory, etc.).

Processing device 300 further includes a bus interface 340 coupled with local bus 305. Bus interface 340 provides an interface with other components of router 200, including bus 205. For simplicity, bus interface 340 is depicted as a single functional unit; however, it should be understood that, in practice, the processing device 300 may include multiple bus interfaces. For example, the processing device 300 may include a PCI bus interface, an IX (Internet Exchange) bus interface, as well as others, and the bus interface 340 is intended to represent a collection of one or more such interfaces.

It should be understood that the embodiment of processing device 300 illustrated and described with respect to FIG. 3 is but one example of a processing device that may find use with the disclosed embodiments of a packet classifier and, further, that the processing device 300 may have other components in addition to those shown in FIG. 3, which components have been omitted for clarity and ease of understanding. For example, the processing device 300 may include other functional units (e.g., an instruction decoder unit, an address translation unit, etc.), a thermal management system, clock circuitry, additional memory, and registers. Also, it should be understood that a processing device may not include all of the elements shown in FIG. 3.

Figure 4:
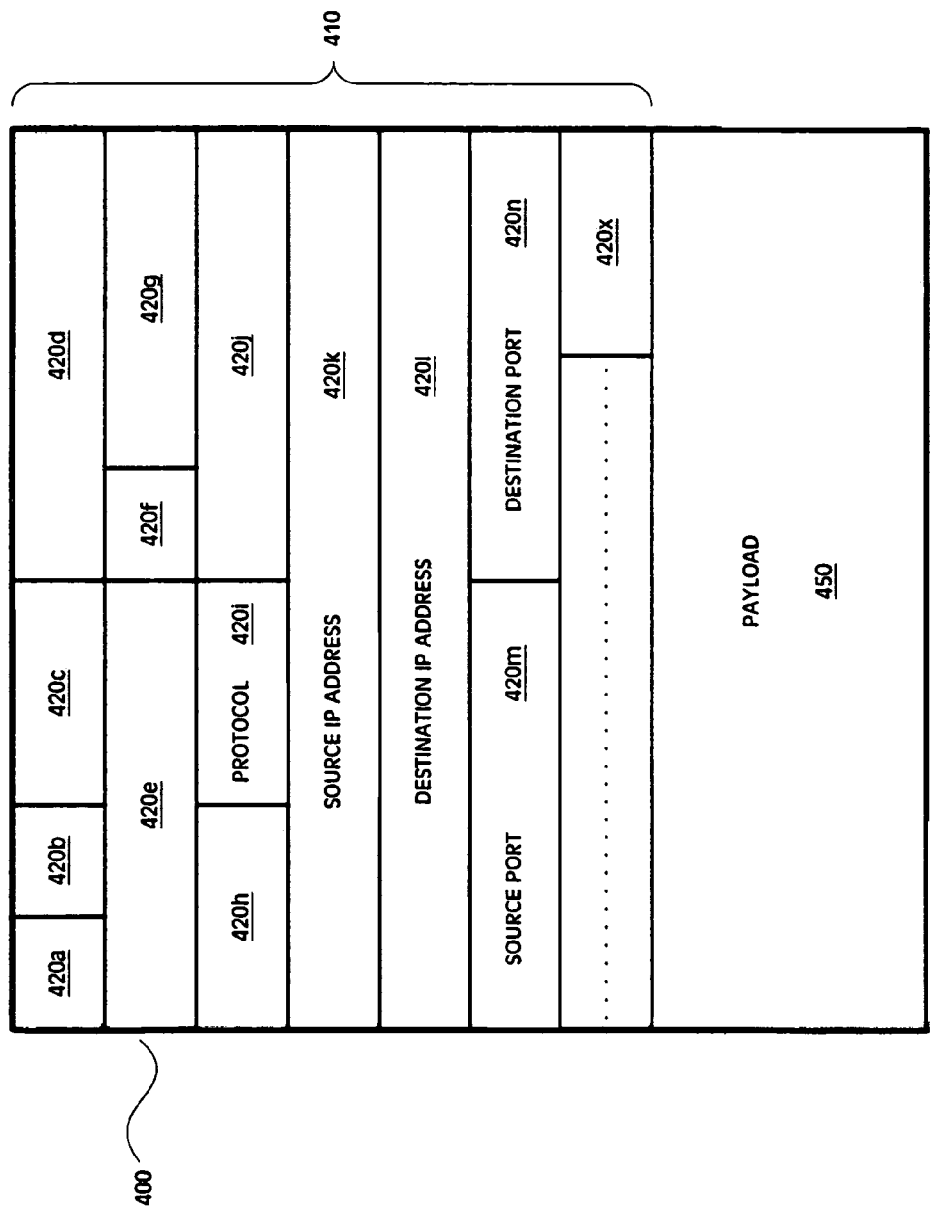
FIG. 4 is a schematic diagram illustrating the makeup of an exemplary packet.

Referring now to FIG. 4, illustrated is an example of a packet 400, as may be received at router 200 (e.g., from other networks 5). The packet 400 includes a header 410 and a payload (or data) 450. The header 410 can have any suitable format, and the packet 400 illustrated in FIG. 4 shows an example of a header associated with the TCP/IP protocols. See, e.g., Internet Engineering Task Force Request for Comment (IETF RFC) 791, *Internet Protocol* (1981), and IETF RFC 793, *Transmission Control Protocol* (1981). In FIG. 4, the header 410 includes a number of fields, including fields 420a, 420b, . . . , 420x. Generally, the fields 420a-x contain identifying information about the packet 400. By way of example, the header 410 may include the protocol 420i (e.g., TCP), a source address 420k, a destination address 420j, a source port 420m, and a destination port 420n. Each of the source and destination addresses 420k, 420i may include thirty-two (32) bits, each of the source and destination ports 420m, 420n sixteen (16) bits, and the protocol 420i eight (8) bits. It will be appreciated by those of ordinary skill in the art that these are but a few examples of the types of information that may be contained in the header of a packet and, further, that packet header 410 may contain any information, as required by the specific hardware and/or application at hand. Also, it should be understood that the format of a packet is not limited to that shown and described with respect to FIG. 4 (e.g., widths of the header fields may vary, type and number of fields may vary, etc.).

A communication will generally be referred to herein as a "packet." However, it should be understood that the disclosed embodiments are applicable to any type of communication (e.g., packets, cells, frames, etc.), irrespective of format or content.

Figure 5A:
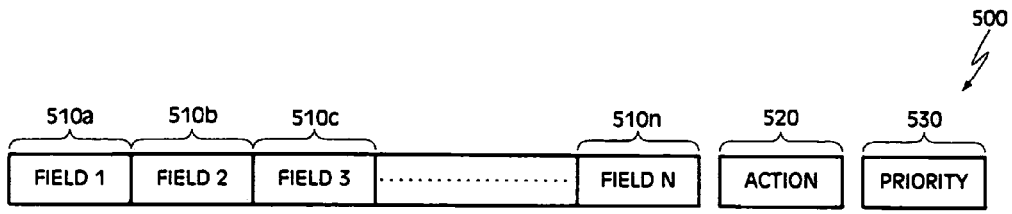
FIGS. 5A-5C are schematic diagrams, each illustrating an embodiment of a packet classification rule.

Turning to FIG. 5A, an embodiment of a packet classification rule 500 is illustrated. Generally, the rule 500 specifies a set of criteria that suggests a particular flow to which a packet satisfying the criteria belongs. The rule 500 includes a number of fields, including fields 510a (FIELD 1), 510b (FIELD 2), . . . , 510n (FIELD N). A rule may contain any suitable number of fields 510a-n, and the number of fields in a rule is referred to herein as the dimension (i.e., the rule 500 has a dimension of N). In one embodiment, each field 510a-n corresponds to a field in the header of a packet, such as a source or destination address. However, in other embodiments, the components 510a-n of a rule may include other information, such as application header fields, link identification information, time-of-day, etc. Generally, a packet "matches" the rule 500 if, for each field 510a-n, the corresponding field in the packet header matches that field of the rule (a field in a classification rule is typically expressed as a range of values, and a value matches a field in the rule if that value is included in the range corresponding to that field). The rule 500 further includes an associated action 520 (e.g., accept, block, etc.) that is to be applied to any packet matching that rule. The rule 500 is also associated with a priority 530.

Figure 5B:
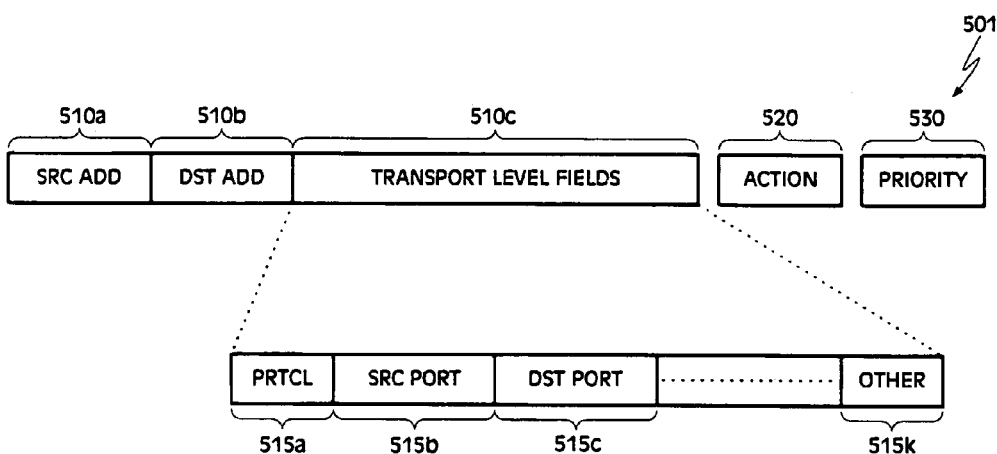

Referring to FIG. 5B, another embodiment of a packet classification rule 501 is illustrated. The rule 501 includes a source address field 510a and a destination address field 510b, as well as a number of transport level fields 510c. Transport level fields 510c may include, by way of example, a protocol 515a, a source port 515b, and a destination port 515c. The transport level fields 510c are not limited to the aforementioned fields, and the transport level fields 510c may include other fields 515d-k (or it may include fewer fields). Other possible transport level fields includes, for example, protocol fields such as the TCP SYN flag and RSVP header fields (see, e.g., IETF RFC 2205, *Resource ReSerVation Protocol (RSVP)—Version 1 Functional Specification* (1997)), as well as others. The rule 501 also includes an associated action 520 and priority 530.

Figure 5C:
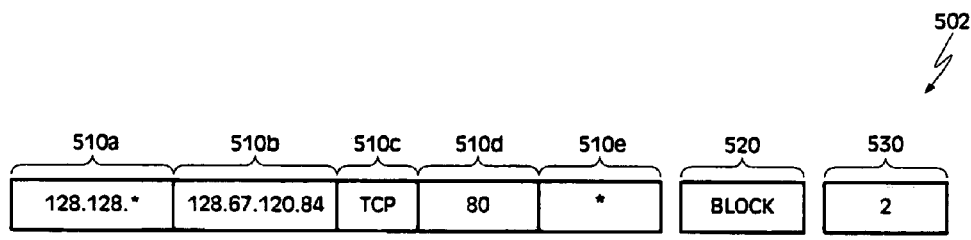

Illustrated in FIG. 5C is an example of the rule shown in FIG. 5B. The rule 502 of FIG. 5C specifies a source IP (Internet Protocol) address 510a equal to "128.128.*", a destination IP address 510b equal to "128.67.120.84", a protocol 510c equal to "TCP", a source port 510d equal to "80", and a destination port 510e equal to "*", where the character "*" represents a "wild card" (i.e., any value can match the wild card). The action 540 is "block" (i.e., any packet satisfying the rule is not allowed), and the rule 502 has a priority 540 equal to "2". Of course, it should be understood that FIG. 5C presents but one example of a rule and, further, that a rule may include any suitable number and type of header fields (i.e., the rule may be of any dimension).

Each field of a rule may be expressed as an exact match (e.g., a source port equal to "80"), a prefix (e.g., a source address of "128.128.*"), or a range specification (e.g., a source port "≦1023"). However, some ranges (e.g., a source port that is ">1023") cannot be represented by a prefix, and such expressions may be broken down into a set of prefixes. For example, the range of ">1023" can be delineated by the following series of prefixes (in binary format): "000001********"; "00001*********";

"0001\*\*\*\*\*\*\*\*\*\*\*\*"; "001\*\*\*\*\*\*\*\*\*\*\*\*\*"; "01\*\*\*\*\*\*\*\*\*\*\*\*\*\*"; and "1\*\*\*\*\*\*\*\*\*\*\*\*\*\*\*". Thus, a rule having the field ">1023" can be expanded into six different rules, one for each of the six distinct prefixes comprising the range specification ">1023". It should be noted here that, in general, a range of K-bits can be broken down into a maximum of (2K−2) prefixes.

Figure 6:
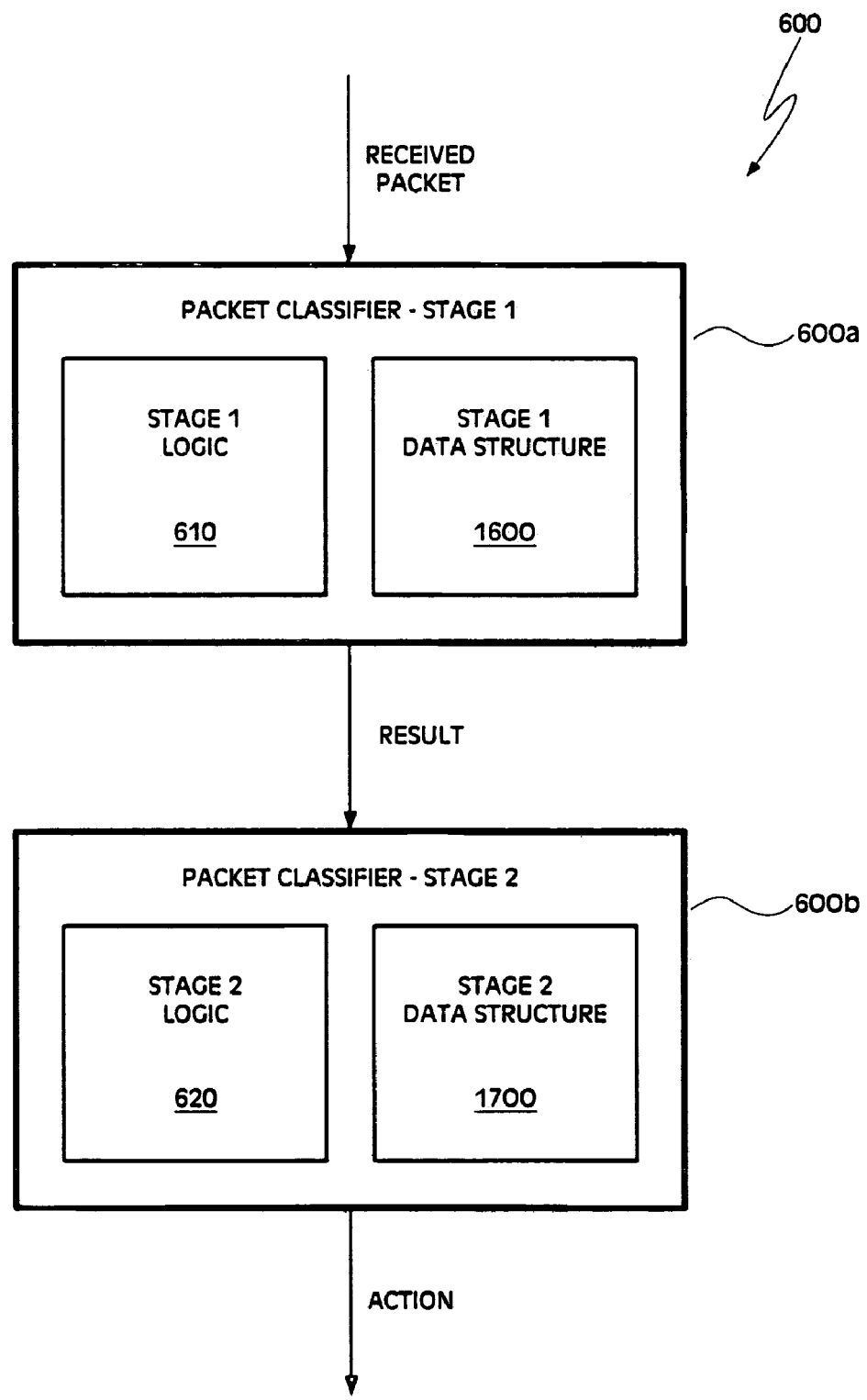
FIG. 6 is a schematic diagram illustrating an embodiment of a two-stage packet classifier.

Illustrated in FIG. 6 is an embodiment of the packet classifier 600. The packet classifier 600 splits the classification process into two stages. The packet classifier 600 includes a first stage 600a (STAGE 1) and a second stage 600b (STAGE 2). In the first stage 600a, a packet is classified on the basis of its network path, and in the second stage 600b, the packet is classified on the basis of one or more other fields (e.g., transport level fields). Associated with the first stage 600a is logic 610 and a data structure 1600, and associated with the second stage 600b is logic 620 and a data structure 1700.

The first stage logic 610 comprises any suitable software, hardware, or combination of software and hardware capable of classifying a received packet on the basis of the packet's network path. In one embodiment, the first stage logic 610 will determine a result based on the received packet's source and destination addresses, and this result is provided to the classifier's second stage 600b. Various embodiments of a method of classifying a packet based on the network path of the packet are described below. Network paths are commonly expressed by source and destination addresses (e.g., a source IP address and a destination IP address). However, it should be understood that expression of a network path is not limited to a source-destination address pair and, further, that other alternative criteria may be used to identify a network path, such as multiprotocol label switching (MPLS) labels (See, e.g., IETF RFC 3031, *Multiprotocol Label Switching Architecture* (2001)), a combination of a source IP address and a destination multicast group, etc. The first stage data structure 1600, which is also described below in more detail, may be stored in any suitable memory, including SRAM, DRAM, SDRAM, DDRDRAM,—as well as other memory types.

The second stage logic 620 comprises any suitable software, hardware, or combination of software and hardware capable of classifying a received packet on the basis of transport level fields (or other fields) contained in the header of a received packet. In one embodiment, the second stage logic 620 receives the result from the first stage of classification and, based on this result and other fields (e.g., transport level fields) of the received packet, determines an action that is to be applied to the packet or otherwise executed. Various embodiments of a method of classifying a packet based on one or more transport level fields (or other fields) contained in the packet's header are described below. The second stage data structure 1700 may be stored in any suitable type of memory, such as a CAM, SRAM, DRAM, SDRAM, or other type of memory. Second stage data structure 1700 is also described below in greater detail.

In one particular embodiment, as alluded to above, the packet classifier 600 is implemented in a combination of software and hardware. More specifically, the first classification stage 600a is implemented in software, and the second classification stage 600b is implemented in hardware. In this embodiment, the first classification stage 600a may comprise a set of instructions stored in a memory (e.g., system memory 210 shown in FIG. 2 and/or on-chip memory subsystem 330 shown in FIG. 3) and executed on a processing device (e.g., processing device 300 of FIG. 3), whereas the second stage 600b may be implemented using a CAM (or other hardware configuration).

Figure 7:
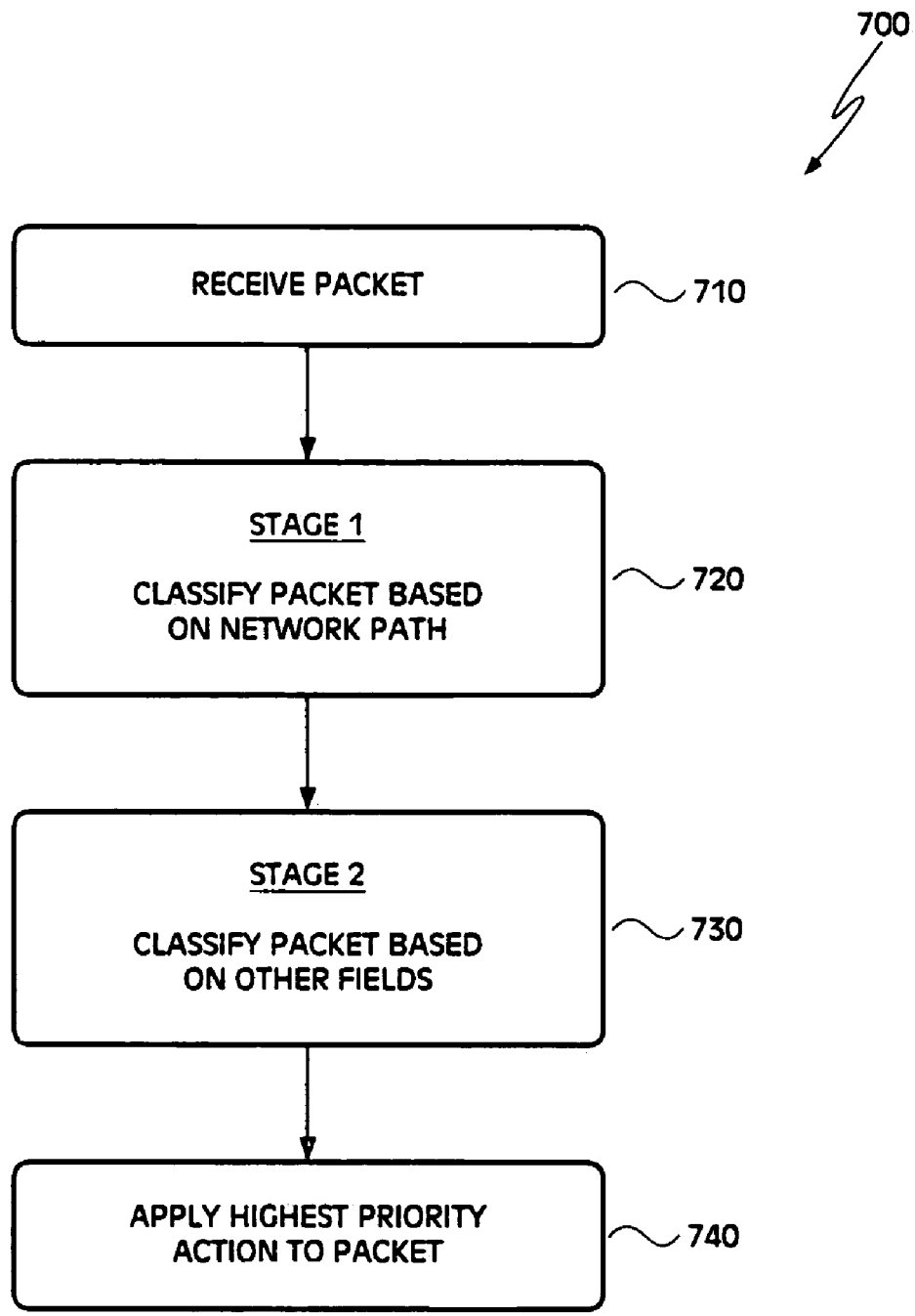
FIG. 7 is a block diagram illustrating an embodiment of a method for two-stage packet classification.

The aforementioned two-stage classification scheme, as can be implemented on the two-stage packet classifier 600 of FIG. 6, is further illustrated in FIG. 7, which shows an embodiment of a method 700 for two-stage packet classification. Referring to block 710 in FIG. 7, a packet is received and, as set forth at block 720, the packet is first classified on the basis of the packet's network path. Generally, the network path of the packet will be expressed in the source and destination addresses contained in the packet's header. The packet is then classified on the basis of one or more other fields contained in the header of the received packet, which is set forth at block 730. Based upon the results of the two stage classification (see blocks 720, 730), a highest priority action is identified, and this action is applied to the packet, as set forth at block 740.

In the Internet, as well as many other large networks, there is usually many possible routes across the network, but relatively few applications. Thus, it follows that the number of distinct network paths will generally be much larger than the number of applications. These observations are borne out by studies of real classification databases, which suggest that the number of source-destination address pairs found in a set of classification rules is generally much larger than the number of other fields (e.g., transport level fields such as port numbers and protocol). These studies also suggest that many different source-destination address pairs use the same set of transport level fields (or other fields) and, further, that the relative priority and action associated with each member of the set is generally the same in each occurrence of the set. In addition, the number of entries in each set is generally small.

The fact that source-destination address pairs in a classification database routinely use the same set of transport level fields is illustrated in FIG. 8. Referring to this figure, an exemplary classification database 800 is shown. The classification database 800 includes a number of classification rules, each rule including a source IP address 810a, a destination IP address 810b, a protocol 810c, a source port 810d, and a destination port 810e, as well as an associated action 820 and an absolute priority 830a. Two groups 801, 802 of rules are shown in FIG. 8, and each rule of the first group has the same network path, as expressed by the source and destination IP addresses 810a-b, and each rule of the second group has the same network path (but distinct from the network path of the first group). The relative priority 830b of each rule within the rule's set (801 or 802) is also shown in FIG. 8. Although the two rule groups 801, 802 each have a different source-destination address pair, these groups of rules share the same set of transport level fields, actions, and relative priority levels (i.e., the protocol, port specifications, actions, and priorities for rule group 801 are repeated for group 802). The combination of a set of (one or more) transport level fields, an action, and a relative priority is referred to herein as a "triplet."

Returning to FIG. 6, in the first stage 600a of packet classification, the N-dimensional classification problem is reduced to a two-dimensional problem, as classification in the first stage can be performed on the basis of a source address and a destination address, which greatly simplifies this stage of classification. Although the second stage 600b may involve classification based upon any number of fields (e.g., three or more), the complexity of this classification problem can be reduced considerably by taking advantage of the aforementioned characteristics of real-world classification data bases. In particular, by realizing that many source-destination address pairs share the same group of triplets (i.e., a set of transport level fields, an action, and a relative priority), the number of entries that need to be checked—and the number of memory accesses—can be substantially reduced. The concept of associating multiple source-destination address pairs with one group of various sets of transport level (or other) fields—i.e., because each of these source-destination pairs uses this same set of triplets—is referred to herein as "transport level sharing" ("TLS"). Although a group of transport level fields can potentially be shared by multiple source-destination address pairs, each unique group of transport level fields can be stored once, thereby reducing the storage requirements of the packet classification system.

The first stage 600*a* of the two-stage classification scheme is simplified by reducing the multi-dimensional classification problem to a two-dimensional one, as noted above. However, it is possible—and, in practice, likely—that a packet will match a number of rules in a classification database and, therefore, the first stage 600*a* will return multiple matches. Multiple matches can occur due, at least in part, to the overlapping nature of the source-destination pairs of all rules in a classification database and, secondly, to the fact that source-destination pairs may be associated with arbitrary priorities. Finding all possible matching rules can significantly increase the number of memory accesses needed in the first classification stage. Furthermore, merging of the results between the first and second stages 600*a*, 600*b* of classification becomes difficult when multiple matches are returned from the first classification stage. Thus, in another embodiment, in order to simplify and increase the efficiency of the first stage 600*a* of packet classification, a single, most specific match is returned from the first stage. In one embodiment, a "most specific match" is a match that provides the greatest amount of information about the network path of a packet (e.g., for IP networks, the most specific match is the intersection of all filters covering the packet). The process of determining and returning a single matching filter from the first classification stage 600*a* is referred to herein as "most specific filter matching" (or "MSFM").

Figure 9:
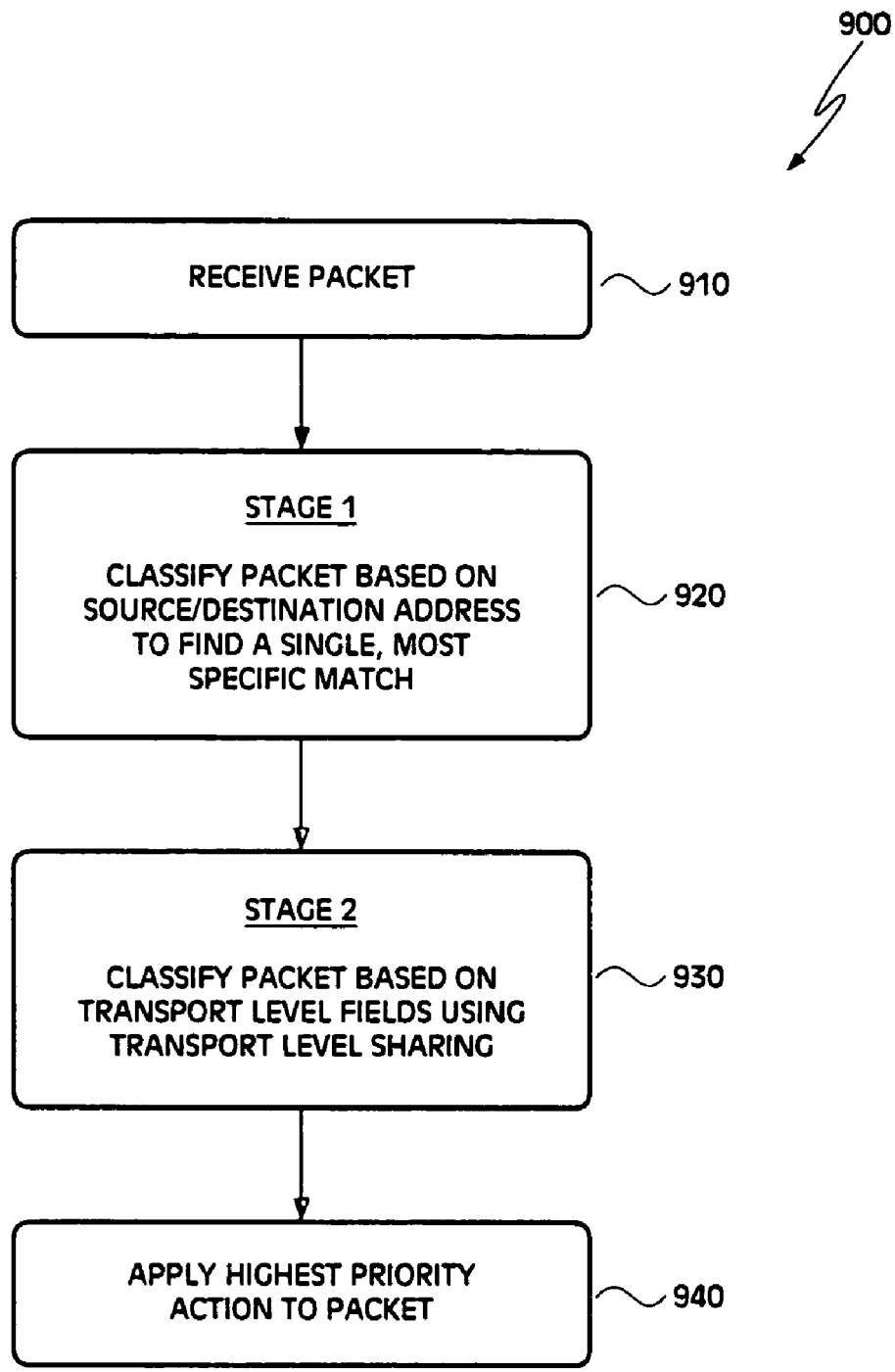
FIG. 9 is a block diagram illustrating another embodiment of a method for two-stage packet classification.

Turning to FIG. 9, another embodiment of a method 900 for two-stage packet classification is illustrated. The method 900 for two-stage packet classification implements both transport level sharing and most specific filter matching. Referring to block 910 in FIG. 9, a packet is received. As set forth at block 920, in the first stage of classification, the packet is classified on the basis of the packet's source and destination addresses to find a single, most specific match. In the second stage of classification, which is set forth at block 930, the packet is classified on the basis of one or more transport level fields using transport level sharing. Based upon the results of the two stages of classification, a highest priority action is determined and applied to the packet, as set forth at block 940. It should be understood that, in another embodiment, most specific filter matching is used in the first stage without transport level sharing in the second stage, whereas in yet a further embodiment, transport level sharing is used in the second stage without most specific filter matching in the first stage.

Both most specific filter matching (MSFM) and transport level sharing (TLS) will now be described in greater detail. This discussion will begin with a description of TLS, followed by a description of MSFM.

Figure 10:
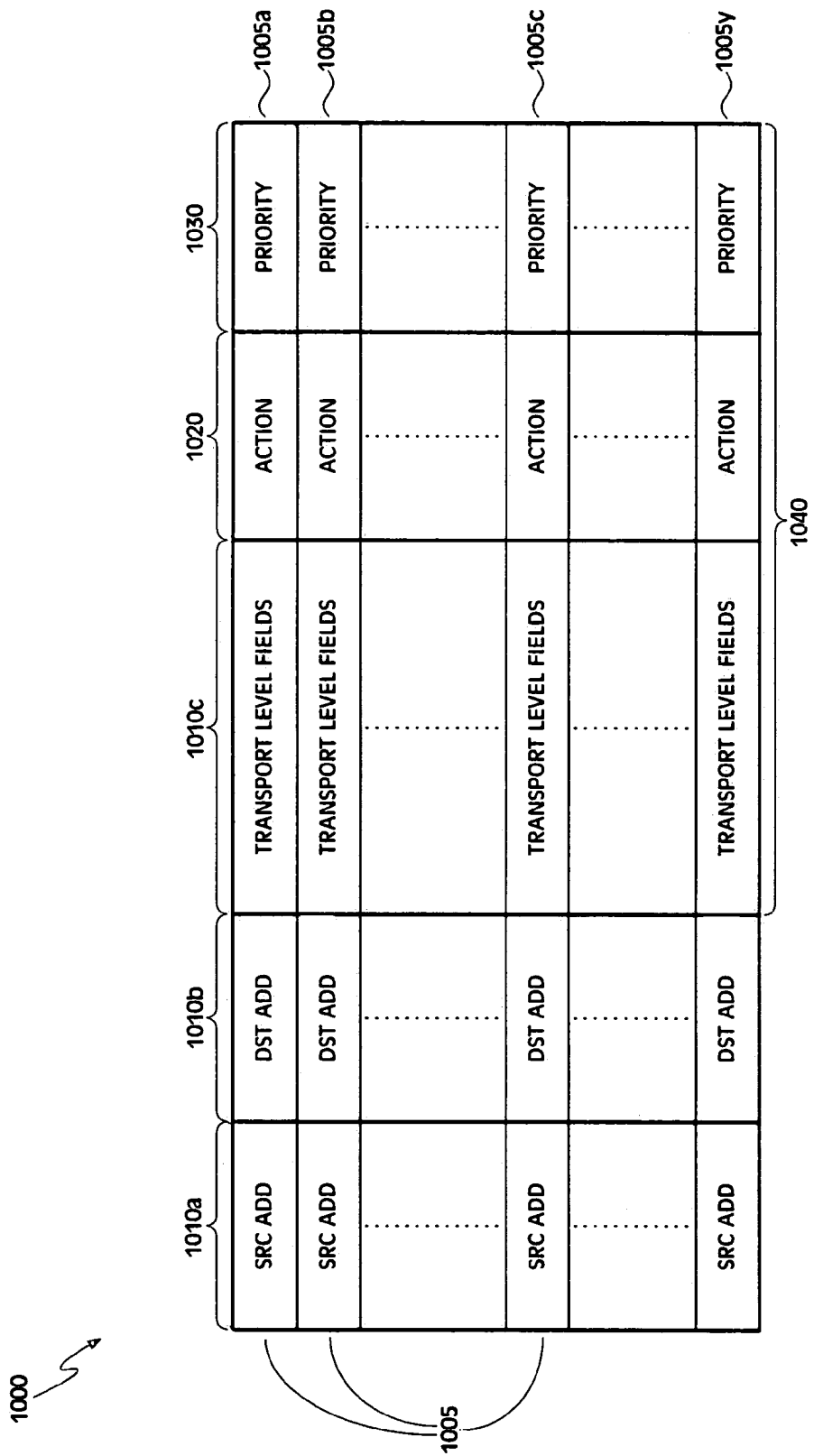
FIG. 10 is a schematic diagram illustrating an embodiment of an classification database comprised of a number of rules.

A typical classification database comprises a list of rules. This is illustrated in FIG. 10, which shows a classification database 1000 comprising a number of rules 1005, including rules 1005*a*, 1005*b*, . . . , 1005*y*. Each of the rules 1005*a-y* includes, for example, a source address 1010*a*, a destination address 1010*b*, and one or more transport level fields 1010*c* (or other fields), as well as an associated action 1020 and priority 1030. For each rule 1005, the combination of the transport level fields 1010*c*, action 1020, and priority 1030 can be referred to as a "triplet" 1040, as previously noted. As discussed above, a typical classification database includes relatively few unique sets of transport level fields in comparison to the number of source-destination pairs and, further, the same group of transport level field sets in the typical database is often shared by multiple source-destination pairs (see FIG. 8 and accompanying text). To exploit this characteristic of classification databases, the rules 1005 of database 1000 are grouped into rule sets. A rule set contains those rules of the database having the same source and destination address pair. For example, returning to FIG. 8, those rules in group 801 may comprise a first rule set (i.e., they share the source address "128.128.10.5" and the destination address "172.128.*"), and those rules in group 802 may comprise a second rule set (i.e., they share the source address "128.128.10.7" and the destination address "172.128.*").

Figure 11A:
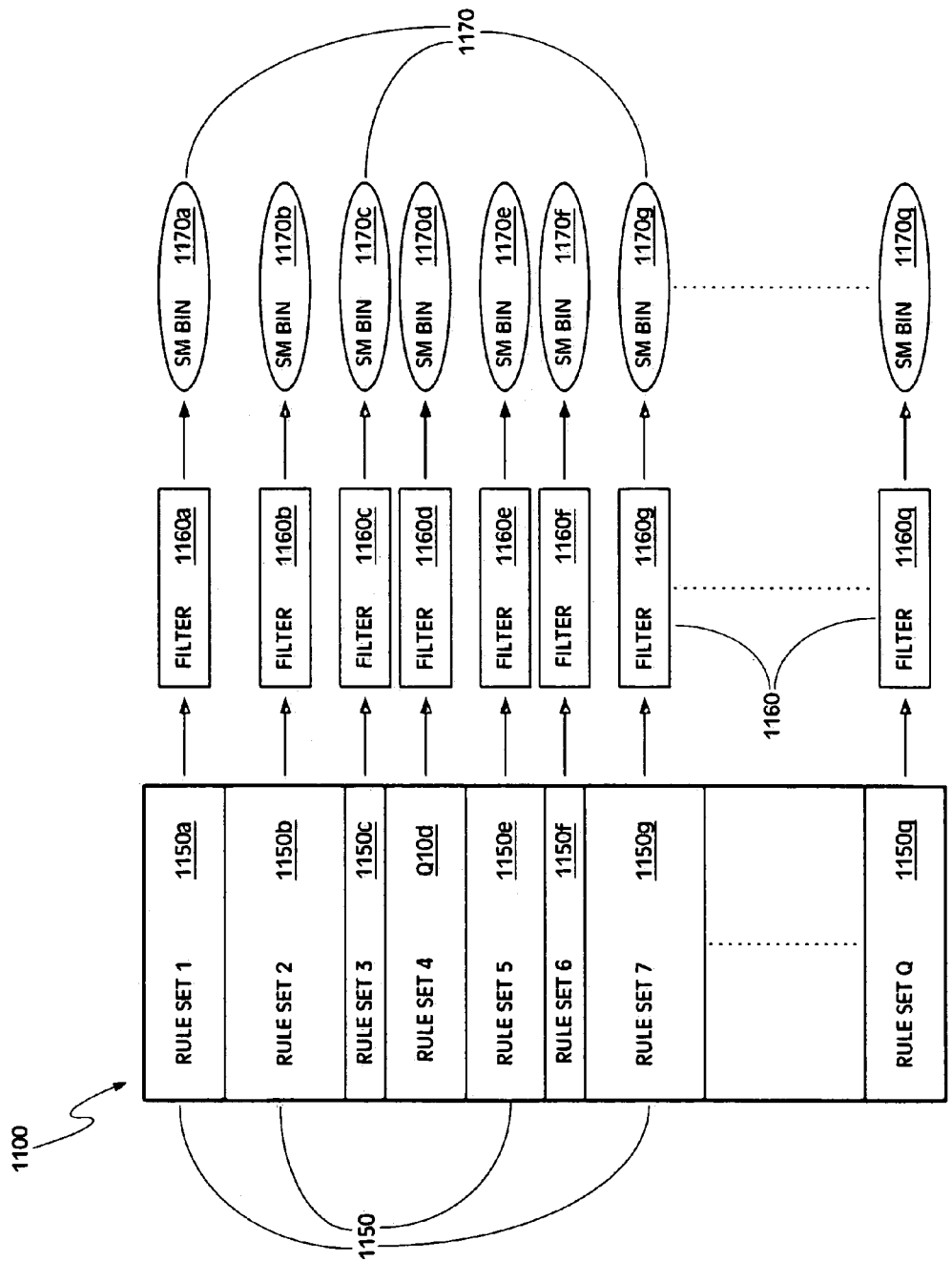
FIGS. 11A-11B are schematic diagrams illustrating an embodiment of the organization of an classification database into a number of rule sets.

One example of the partitioning of a classification database into a number of rule sets is illustrated in FIG. 11A. Referring to this figure, a classification database 1100 has been organized into a number of rule sets 1150, including rule sets 1150*a*, 1150*b*, . . . , 1150*q*. Each rule set 1150*a-q* includes one or more rules, wherein each rule within a given rule set 1150 shares the same source and destination address pair with all other rules in that rule set. In one embodiment, as shown in FIG. 11A, the rules of the database 1100 are ordered such that the rules of each rule set 1150*a-q* occupy a contiguous space in the database. Also, the rules within a rule set 1150 may occupy consecutive priority levels; however, in another embodiment, a rule set may be formed by rules that do not occupy consecutive priority levels. The rule sets 1150*a-q* can each be thought of as being associated with a filter 1160 (i.e., rule set 1150*a* is associated with filter 1160*a*, rule set 1150*b* is associated with filter 1160*b*, and so on), where the filter 1160 for a rule set 1150 comprises the source-destination pair for that rule set. It should be understood that the embodiment of FIG. 11A is but one example of the way in which the rules of a classification database may form rule sets.

Each of the rule sets 1150 in FIG. 11A (and each corresponding filter 1160) will have a group of associated triplets, each triplet comprising a number of transport level (or other) fields, an action, and a relative priority. Returning again to FIG. 8, each of the rule sets 801, 802 has a group of three triplets associated with it and, in the example of FIG. 8, it so happens that each rule set 801, 802 has the same group of triplets (i.e., the source-destination pairs of rule set 801, 802, respectively, share the same set of triplets). The triplets associated with any rule set and filter constitute groups that are referred to herein as "bins" and, in this instance, "small bins" (to be distinguished from "large bins", which are described below). Thus, as shown in FIG. 11A, each rule set 1150 and corresponding filter 1160 are associated with a small bin 1170 of triplets (i.e., rule set 1150*a* and filter 1160*a* are associated with small bin 1170*a*, and so on). It is this sharing of a group of various sets of transport level fields (i.e., a small bin) amongst a number of rules contained in a rule set that leads to the notion of transport level sharing.

Figure 11B:
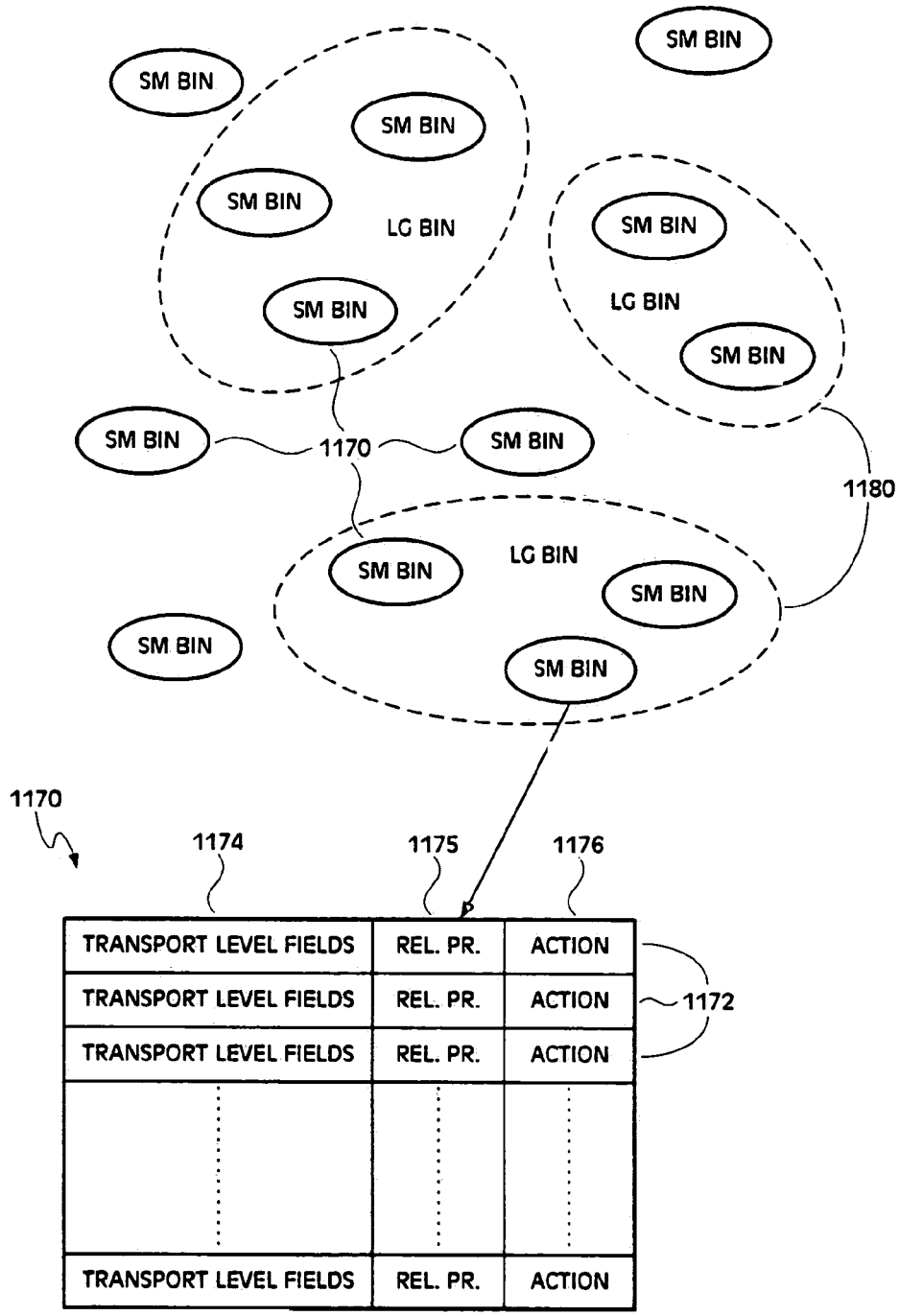

The small bins 1170 associated with the database 1100 of FIG. 11A are further illustrated in FIG. 11B. Referring to FIG. 11B, the database 1100 has associated therewith a collection of small bins 1170. Each small bin 1170 includes one or more entries 1172, each of the entries 1172 comprising a set of one or more transport level (or other) fields 1174, a relative priority 1175, and an action 1176 (i.e., a triplet). As is also shown in FIG. 11B, the small bins 1170 may be further logically organized into "large bins" 1180, each large bin 1180 comprising a collection of two or more small bins 1170. The creation of large bins 1180 will be described below.

The second stage data structure 1700 that is used to classify packets on the basis of transport level fields will be described below. We now turn our attention to a discussion of most specific filter matching.

As previously suggested, when classifying a packet based upon the packet's network path, it is likely that a packet will match multiple rules in a classification database. In order to increase the efficiency of the first classification stage 600a— e.g., to reduce the number of required memory accesses— and, further, in order to simplify merging of the result of the first stage with the second classification stage 600b, it is desirable to return a single, most specific match from the first stage.

It should be noted that, at this point in our discussion, the term "filter" will be used rather than "rule", as the term "filter" is used herein to refer to the source-destination address pair associated with a rule set (see FIGS. 11A-11B and the accompanying text above). However, it should be understood that the terms "filter" and "rule" are often times used interchangeably.

That a packet being classified on the basis of its source and destination addresses can match multiple filters is due, at least in part, to the overlapping nature of filters in a classification database. This is illustrated schematically in FIGS. 12A through 12C and in FIGS. 13A through 13C. Referring first to FIG. 12A, the source and destination addresses of a rule can be thought of as a region in a two-dimensional space (i.e., either a rectangle, line, or point). In FIG. 12A, a first filter 1210 of a classification database occupies the two-dimensional space shown by the rectangle labeled F1. The filter F1 is associated with a small bin 1215 (B1) of triplets. Turning to FIG. 12B, a second filter 1220 (F2) of the database also occupies a region in the source and destination address space, and this filter F2 is associated with a small bin 1225 (B2) of transport level fields.

Both filters F1 and F2 are shown in FIG. 12C, and it can be observed that the regions defined by these two filters overlap or intersect, the intersection of F1 and F2 being designated by reference numeral 1290. The filters F1 and F2 shown in FIGS. 12A-12C are said to be "partially overlapping." If a packet (P) 1205 has a source-destination address pair falling within the intersection 1290 of filters F1 and F2, this packet will match both filters (i.e., filters F1 and F2 have at least the point defined by packet P in common). Also, the packet P, as well as any other packet falling within the intersection 1290 of filters F1 and F2, will be associated with a union of the small bins B1 and B2 associated with F1 and F2, respectively. This union of small bins associated with the intersection of two or more filters is referred to herein as a "large bin." The large bin comprising the union of bins B1 and B2 is designated by reference numeral 1295 in FIG. 12C.

Filters may also be "completely overlapping," and this scenario is illustrated in FIGS. 13A-13C. A first filter 1310 (F1) occupies the region in two-dimensional space shown in FIG. 13A, and a second filter 1320 (F2) occupies the region in this space shown in FIG. 13B. The filter F1 has an associated small bin 1315 (B1), and the filter F2 has an associated small bin 1325 (B2). Referring next to FIG. 13C, both filters F1 and F2 are shown, and these filters overlap at an intersection 1390 (in this instance, the intersection 1390 is equivalent to the region defined by F2). Because the region defined by F2 (and intersection 1390) is fully contained in the two-dimensional space of filter F1, filters F1 and F2 are said to be "completely overlapping." A packet (P) 1305 falling within the intersection 1390 will match both filters F1 and F2, and this packet P (and any other packet falling in this intersection 1390) will be associated with a large bin 1395 comprised of the union of small bins B1 and B2.

As can be observed from FIGS. 12A-12C and 13A-13C, a packet having a source address and destination address lying within the intersection of two (or more) filters will match both filters. To achieve the goal of returning only a single match from the first stage of classification, the intersections of all filters are included in the filter database (i.e., the first stage data structure 1600). Further, each filter intersection is associated with the union of the transport level fields of the individual filters making up that intersection. In other words, each filter intersection is associated with a large bin, which comprises a union of two or more small bins, as described above. Adding all filter intersections into a look-up table could, in theory, require a very large storage capacity. However, studies of real classification databases suggest that, in practice, the additional capacity needed to store filter intersections is much smaller than the theoretical upper bound.

To classify a packet on the basis of its source and destination addresses, the problem becomes one of finding the smallest intersection of filters where the packet is located (or simply the filter, if the packet does not lie in an intersection). To find this smallest intersection of filters, the first stage of classification (a two-dimensional classification problem) is split into two one-dimensional look-ups. This is illustrated schematically in FIG. 14, which shows a first dimension 1410 and a second dimension 1420. In the first dimension 1410, the source address of a received packet is compared with the entries of a source address look-up data structure 1412, and if a match is found, an index 1414 (I1) is returned. Similarly, in the second dimension 1420, the destination address of the packet is compared with the entries of a destination address look-up data structure 1422, and a second index 1424 (I2) is returned if a match is found. The two indices 1414, 1424 (I1 and I2) are then combined to form a key 1430, which can be used to query another look-up data structure (e.g., a hash table). In one embodiment, the look-ups performed on the look-up data structures 1412, 1422 of the first and second dimensions 1410, 1420, respectively, are carried out using longest prefix matching (LPM). In a further embodiment, the look-ups in the two dimensions 1410, 1420 are performed in parallel. It is believed that utilizing two parallel and independent look-ups on the source and destination dimensions will require a relatively low number of memory accesses and will exhibit reasonable storage requirements.

Figure 14:
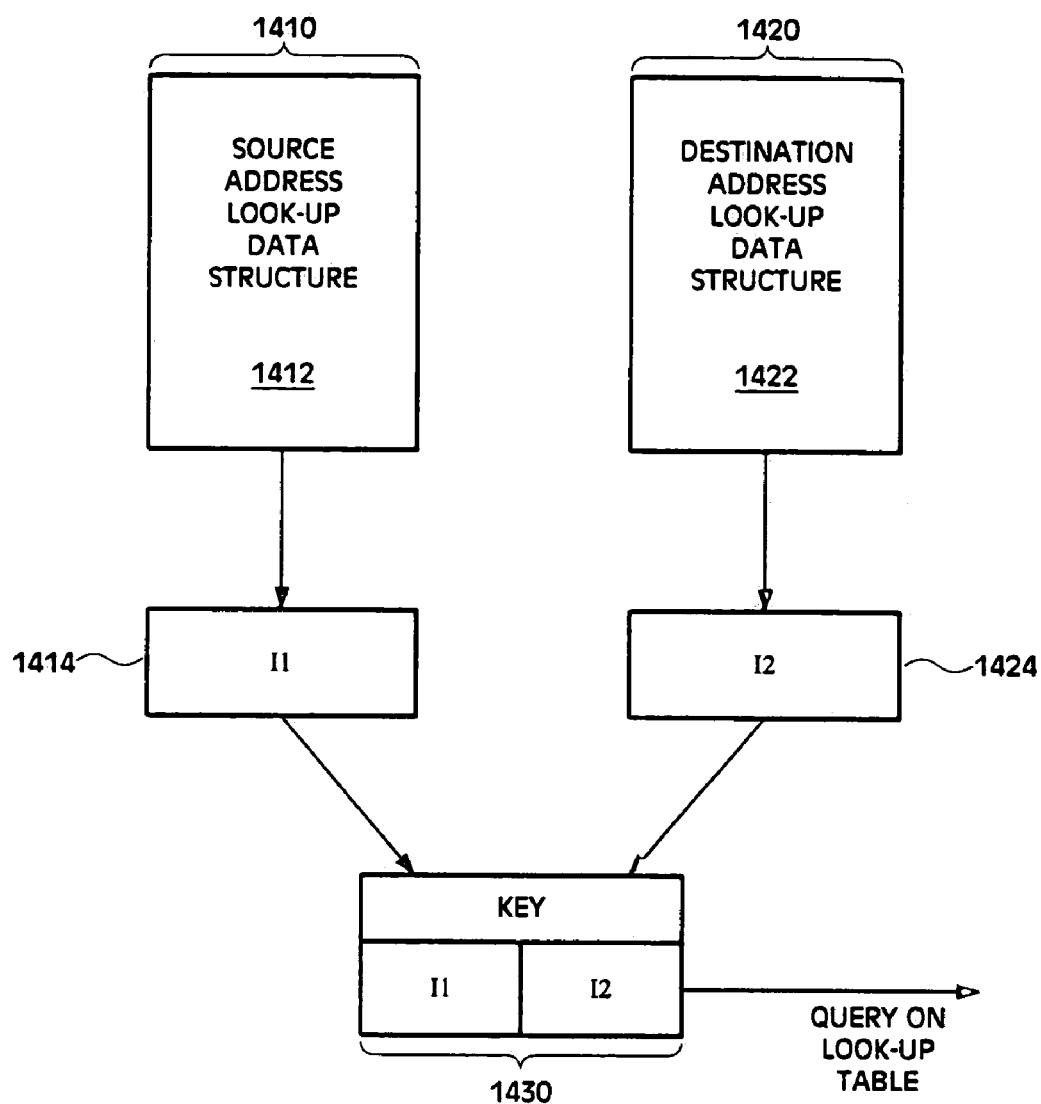
FIG. 14 is a schematic diagram illustrating an embodiment of two parallel look-ups in the source and destination address space.

The parallel LPM look-up scheme illustrated in FIG. 14 will return either the smallest intersection of filters where a packet lies, or this scheme will return a "non-existent" filter. A non-existent filter comprises the source address of one filter and the destination address of a different filter. Non-existent filters result from the fact that look-ups on the source and destination addresses are performed independently (although, for one embodiment, these look-ups are performed in parallel).

Figure 15:
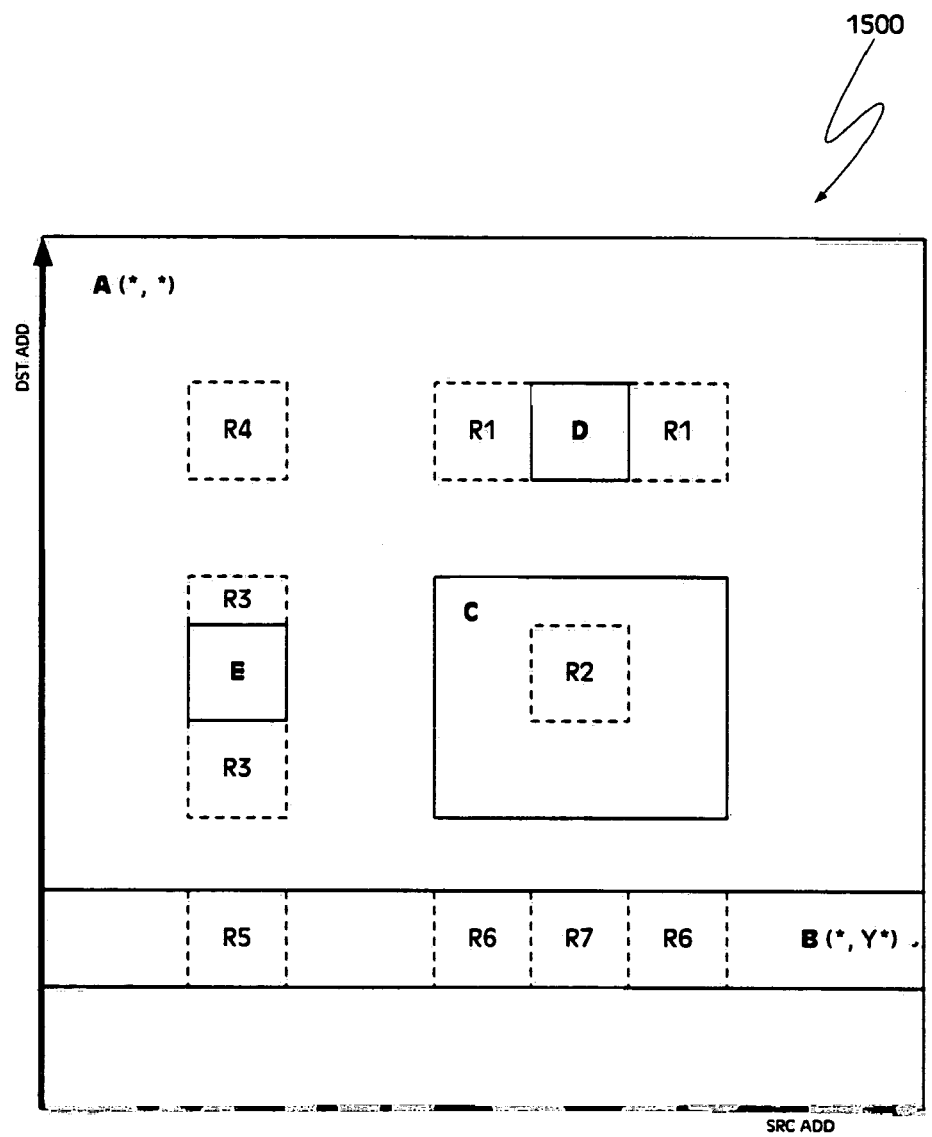
FIG. 15 is a schematic diagram illustrating the formation of non-existent filters from the filters of a classification database.

The concept of non-existent filters may be best understood with reference to an example. Referring to FIG. 15, a database includes five filters designated by the letters A, B, C, D, and E, and these filters are shown in a two-dimensional address space 1500. Filter A covers the entire source and destination address space, and this filter may be designated by "*, *" (i.e., it has the wildcard character "*" in both the source and destination addresses). Filter B is of the form "*, Y*", and filters of this form (i.e., "*, Y*" or "X*, *") are referred to as "partially specified filters." Filters C, D, and E are referred to as "fully specified filters", and these filters are of the form "X*, Y*". By way of example, the filter "SRC ADD 128.172.*/

DST ADD*" is a partially specified filter, whereas the filter "SRC ADD 128.172.*/DST ADD 128.128.*" is a fully specified filter. The combinations of the source and destination addresses of filters A, B, C, D, and E form twelve different regions in the two-dimensional space. The first five regions correspond to the filters A, B, C, D, and E. The other seven regions, which are designated as R1 through R7 (shown by dashed lines), correspond to non-existent filters. The regions R1 through R7 are formed from the destination address of one filter and the source address of another filter, and these regions are created because the look-ups on the source and destination addresses are performed independently, as noted above. For example, region R4 is created by combining the source address of filter E and the destination address of filter D, which results in a filter that does not exist. The diagram shown in FIG. 15 is commonly referred to as a cross-producting table.

To insure the parallel look-up scheme of FIG. 14 returns a result, it would seem that all of non-existent filters R1 through R7 would need to be entered into the filter database. A number of prior art techniques (e.g., cross-producting table schemes) suggest adding all non-existent filters into a filter database. However, inspection of real classification databases suggests that the number of non-existent filters can be quite large and, therefore, it would be desirable to minimize the number of non-existent filters that are added to the filter database. Thus, in one embodiment, only a subset of all possible non-existent filters are included in the classification data structure. The manner in which the addition into the classification data structure of all possible non-existent filters is avoided (and a subset of the non-existent filters placed in the data structure in lieu of all possible non-existent filters) is described below in greater detail.

With reference to FIG. 15, it can be observed that many of the regions R1 through R7 can be aggregated into a small number of other filters. In particular, the smallest filter that can completely cover regions R1, R3, and R4 is filter A, which is the entire two-dimensional space. A search on either the source or destination address of any packet falling in one of regions R1, R3, and R4 will return the source or destination address of a filter included in region A. Thus, non-existent filters R1, R3, and R4 can be aggregated into filter A, and separate entries for R1, R3, and R4 can be removed from the filter database, provided there exists a separate entry for the filter "*, *". Similarly, the regions R5, R6, and R7 are completely covered by filter B, and these non-existent filters can be aggregated with the entry for filter B. For any packet lying in one of the regions R5, R6, or R7, a search on the destination address of this packet will return the destination address of filter B. Therefore, separate database entries for R5, R6, and R7 are not needed, so long as a separate entry for the partially specified filter B is provided in the classification data structure.

Region R2 cannot, however, be merged with any other filter. This region, which is formed from the source address of filter D and the destination address of filter E, is completely covered by a fully specified filter—i.e., filter C. Non-existent filter R2 is distinguished from the other non-existent filter in that it is the only one that is completely contained in a fully specified filter. The non-existent filter R2 cannot be aggregated with filter C, or any other entry, and an entry for this filter should be placed in the filter database. Non-existent filters, such as R2, are also referred to herein as "indicator filters." An indicator filter is associated with the set of transport level fields corresponding to the smallest possible intersection of filters that completely covers the indicator filter. By way of example, for the set of filters shown in FIG. 15, the filters that completely cover the region R2 are filters A and C, and the intersection of these two filters is simply filter C. Thus, the indicator filter R2 will be associated with the same set of transport level fields as filter C.

Some additional observations aid in the development of the first stage data structure 1600. Generally, there are three sources of partial overlap between filters in a classification database, including: (1) partial overlaps created between partially specified filters (i.e., filters of the form "X*, *" or "*, Y*"); (2) partial overlaps created between fully specified filters (i.e., filters of the form "X*, Y*"); and (3) partial overlaps created between partially specified filters and fully specified filters. Note that each partially specified filter having the wildcard in the source dimension creates a partial overlap with all partially specified filters having the wildcard in the destination dimension, and the number of partial overlaps created by the intersections of such partially specified filters is equal to the product of the number of partially specified filters in each of the source and destination dimensions, respectively. The number of partial overlaps due to intersections of partially specified filters can, in theory, be quite large. On the other hand, fully specified filters create an insignificant number of partial overlaps with one another, a result that arises because, in practice, most fully specified filters are segments of straight lines or points in the two-dimensional address space.

As suggested in the preceding paragraph, partially specified filters will typically be the main source of partial overlaps amongst filters in a typical classification database. However, partially specified filters often represent a small fraction of the total number of filters in a classification database, because network administrators usually specify rules that apply to traffic exchanged between particular address domains. Thus, the number of partial filter overlaps caused by partially specified filters is, in practice, significantly less than the theoretical worst case. Also, as noted above, fully specified filters create an insignificant number of partial overlaps between filters. Accordingly, the number of partial overlaps present in real classification databases is generally much smaller than would, in theory, be expected to occur.

At this point, it should be noted that we have not concerned ourselves with completely overlapping filters, as that illustrated in FIGS. 13A-13C. As set forth above, in one embodiment, longest prefix matching (LPM) is used in each of the two one-dimensional searches performed in MSFM. If filters completely overlap, the intersection of these filters is equal to one of these filters, and LPM searching will identify this filter. Thus, the first stage data structure 1600 does not, in one embodiment, need to account for completely overlapping filters.

The above observations and discussion (e.g., see FIGS. 6-15 and the accompanying text) present the "building blocks" that can be used to construct the first stage data structure 1600, as well as an the second stage data structure 1700, and embodiments of these two data structures are now described. Embodiments of a method of searching the first and second stage data structures 1600, 1700 to classify a packet (i.e., to identify an action to apply to the packet) are also presented below.

Figure 16A:
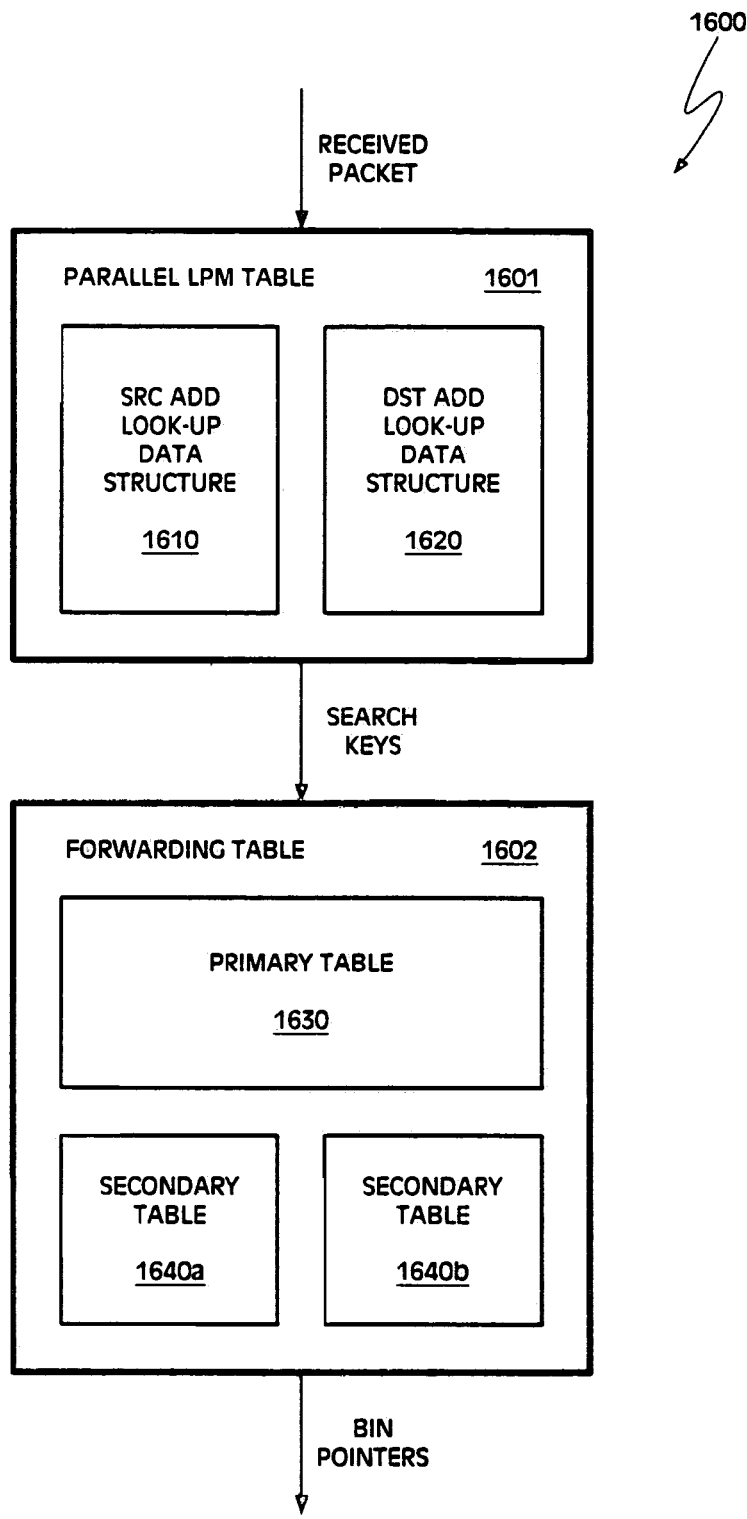
FIG. 16A is a schematic diagram illustrating an embodiment of a first classification stage data structure.

Referring now to FIG. 16A, illustrated is an embodiment of the first stage data structure 1600. The first stage data structure 1600 includes a parallel LPM data structure 1601 and a forwarding table 1602. As noted above, the MSFM scheme employs two one-dimensional searches performed on the source and destination addresses, respectively, as shown and described above with respect to FIG. 14. Accordingly, the parallel LPM data structure includes a source address look-up data structure 1610 and a destination address look-up data structure 1620. In one embodiment, the source and destination address look-up data structures 1610, 1620 are realized as trie data structures. It will, however, be appreciated by those of ordinary skill in the art that other alternative data structures may be used for realizing the source and destination address look-up data structures 1610, 1620.

Figure 16B:
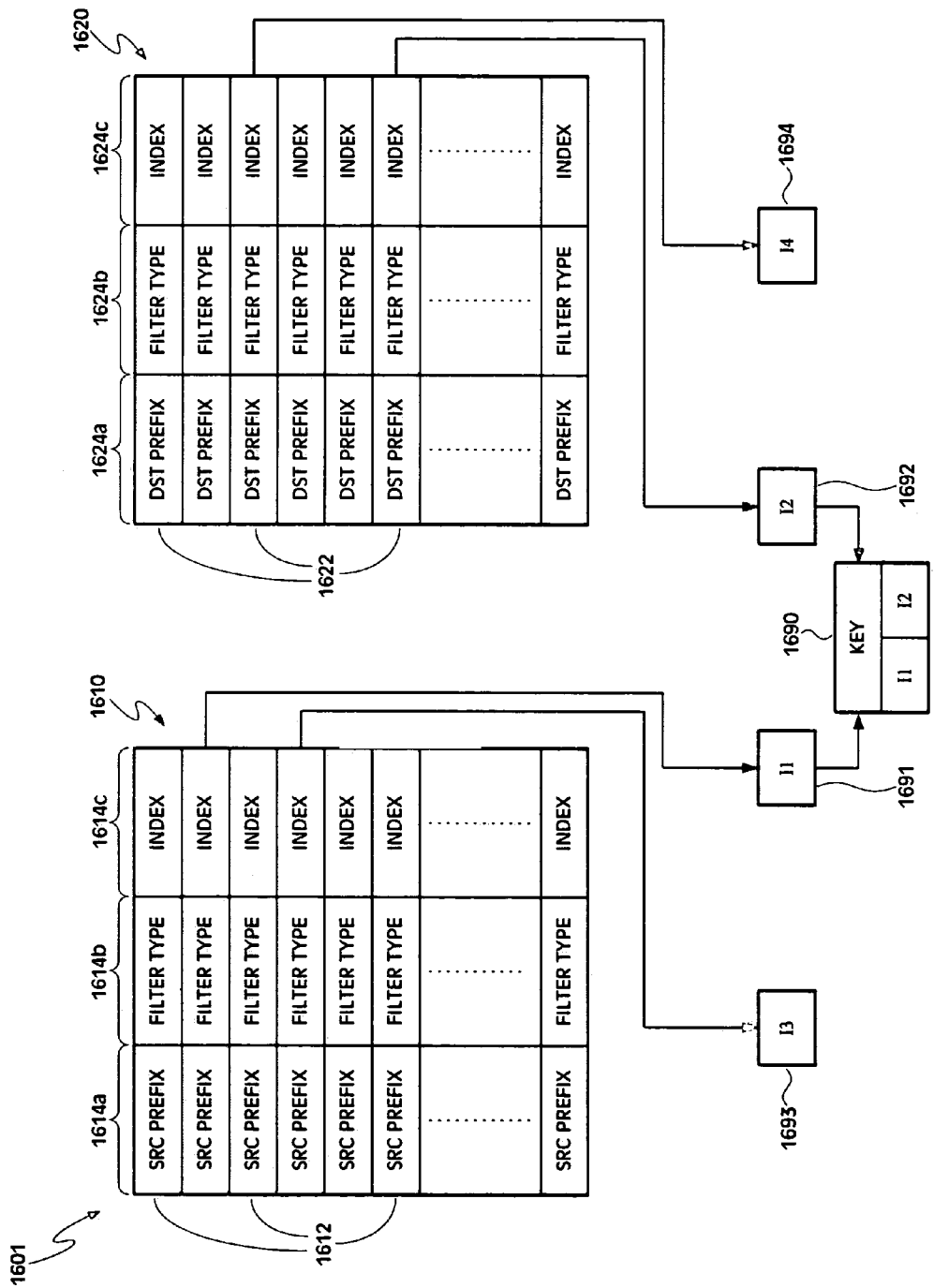
FIG. 16B is a schematic diagram illustrating an embodiment of a parallel longest prefix match look-up table.

An embodiment of the parallel LPM data structure 1601 is further illustrated schematically in FIG. 16B. The source address look-up data structure 1610 includes a number of entries 1612, each of the entries 1612 specifying a source prefix 1614a, a filter type 1614b, and an index value 1614c (or other identifier). Similarly, the destination address look-up data structure 1620 includes a number of entries 1622, each entry 1622 specifying a destination prefix 1624a, a filter type 1624b, and an index value 1624c (or other identifier). For both look-up data structures 1610, 1620, the filter type 1614b, 1624b indicates whether that entry 1612, 1622 is associated with a fully specified filter or a partially specified filter. When a search is performed on the parallel LPM data structure 1601, four indexes (or other identifiers) are returned, including a first index 1691 (I1) associated with a matching fully specified filter in the source address look-up data structure 1610, a second index 1692 (I2) associated with a matching fully specified filter in the destination address look-up data structure 1620, a third index 1693 (I3) associated with a matching partially specified filter in the source address look-up data structure, and a fourth index 1694 (I4) associated with a matching partially specified filter in the destination address look-up data structure. As noted above, the searches in the source and destination address dimensions are, in one embodiment, performed in parallel.

The first two indexes 1691 and 1692 (I1 and I2) associated with fully specified filters are combined to create a key 1690. The key 1690, which is associated with a fully specified filter, as well as the third and fourth indexes 1693, 1694, which are associated with partially specified filters, are used to search the forwarding table 1602, as will be described below. The reason for distinguishing between fully and partially specified filters at this juncture is that, should the matching filter be a partially specified filter and should longest prefix matching be used in the first stage of classification, the partially specified filter that you are looking for may not be identified (i.e., the matching source or destination prefix you identify may be "longer" than the corresponding prefix of the actual matching filter).

In one embodiment, as shown in FIG. 16A, the forwarding table 1620 includes a primary table 1630 and two secondary tables 1640a, 1640b. The primary table 1630 includes entries for fully specified filters, fully specified filter intersections, and indicator filters. Again, an indicator filter is a region that is formed from the source and destination prefixes of different source-destination pairs and that cannot be aggregated with a fully specified filter or filter intersection (e.g., see FIG. 15, region R2, as discussed above). One of the secondary tables 1640a-b includes entries for partially specified filters having the wildcard in the source dimension, whereas the other of the secondary tables 1640a-b includes entries for partially specified filters having the wildcard in the destination dimension. The secondary tables 1640a, 1640b do not include indicator filters. As noted above, some regions created from the source (or destination) prefix of one filter and the destination (or source) prefix of another filter can be aggregated with a partially specified filter (see FIG. 15, regions R5, R6, and R7), and entries for such regions do not need to be added into the primary table.

Figure 16C:
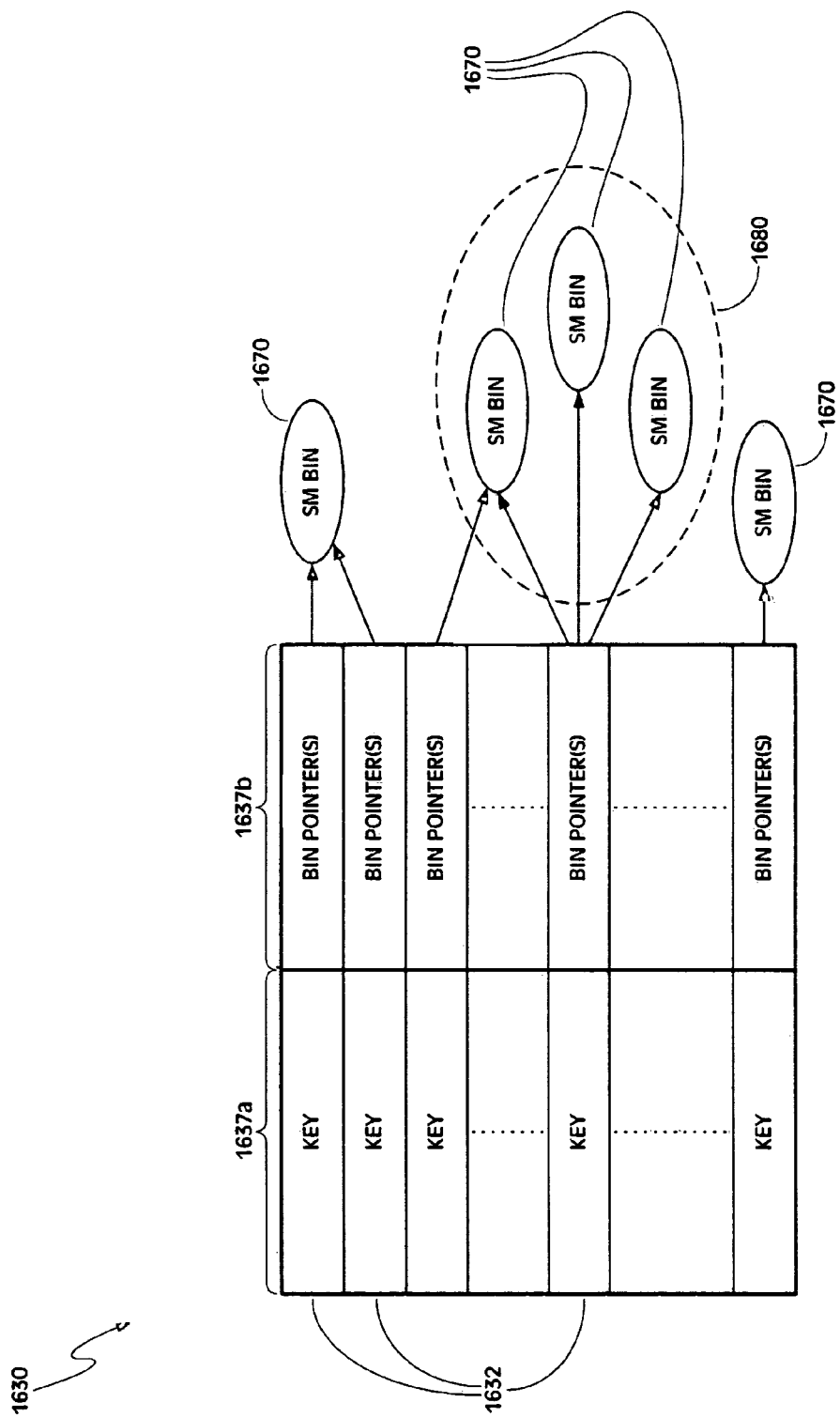
FIG. 16C is a schematic diagram illustrating an embodiment of the primary look-up table of FIG. 16A.

An embodiment of the primary table 1630 is shown in FIG. 16C. Referring to this figure, the primary table 1630 includes a number of entries 1632, each entry including a key 1637a and one or more bin pointers 1637b. The key 1690 created from the first and second indexes 1691, 1692 (I1 and I2) identified in the parallel LPM search (see FIG. 16B) is used to search the primary table 1630. If the key 1690 matches the key 1637a of any entry 1632 of the primary table, the bins identified by the bin pointers 1637b in that entry are accessed to find an action (e.g., a highest priority action) that is to be applied to the received packet, a process which is described in greater detail below. An entry 1632 may point to one small bin 1670 or, alternatively, to a group of small bins—i.e., a "large bin" 1680 comprising a union of small bins corresponding to a filter intersection. Note that, in some embodiments, a large bin 1680 does not have to be stored, as the corresponding entry of the primary table will include a pointer to all small bins contained in the large bin, a result that may occur where, for example, the rule sets are comprised of rules that occupy consecutive priority levels. In other embodiments, however, large bins may be stored (e.g., where rules in the rule sets occupy non-consecutive priority levels). Also, as depicted in FIG. 16C, multiple entries 1632 may point to, or share, the same small bin (or bins) 1670, a result of transport level sharing.

Each of the secondary tables 1640a, 1640b is similar to the primary table 1630. However, the key for accessing one of the secondary tables comprises the third index 1693 (I3), and the key for accessing the other secondary tables comprises the fourth index 1694 (I4). If a query on the primary table 1630 returns a match, the secondary tables 1640a-b are ignored, and the matching entry of the primary table corresponds to the most specific matching filter. However, if no match is found in the primary table, then a query on one of the secondary tables 1640a-b may return a match, and this matching entry will correspond to the most specific matching filter. In the event that queries on the primary and secondary tables 1630, 1640a-b do not return a match, a default filter corresponding to the entire two-dimensional filter space (i.e., "*, *") is used as the most specific filter.

In one embodiment, the primary table 1630 and the secondary tables 1640a, 1640b are implemented as hash tables. In this embodiment, a hashing function may be applied to the key (i.e., the key 1690 or the third and fourth indexes 1693, 1694) to create a search key used for searching the primary and secondary hash tables. Of course, it should be understood that hash tables represent but one example of the manner in which the primary and secondary tables 1630, 1640a-b can be implemented and, further, that other alternative data structures may be utilized.

Figure 17:
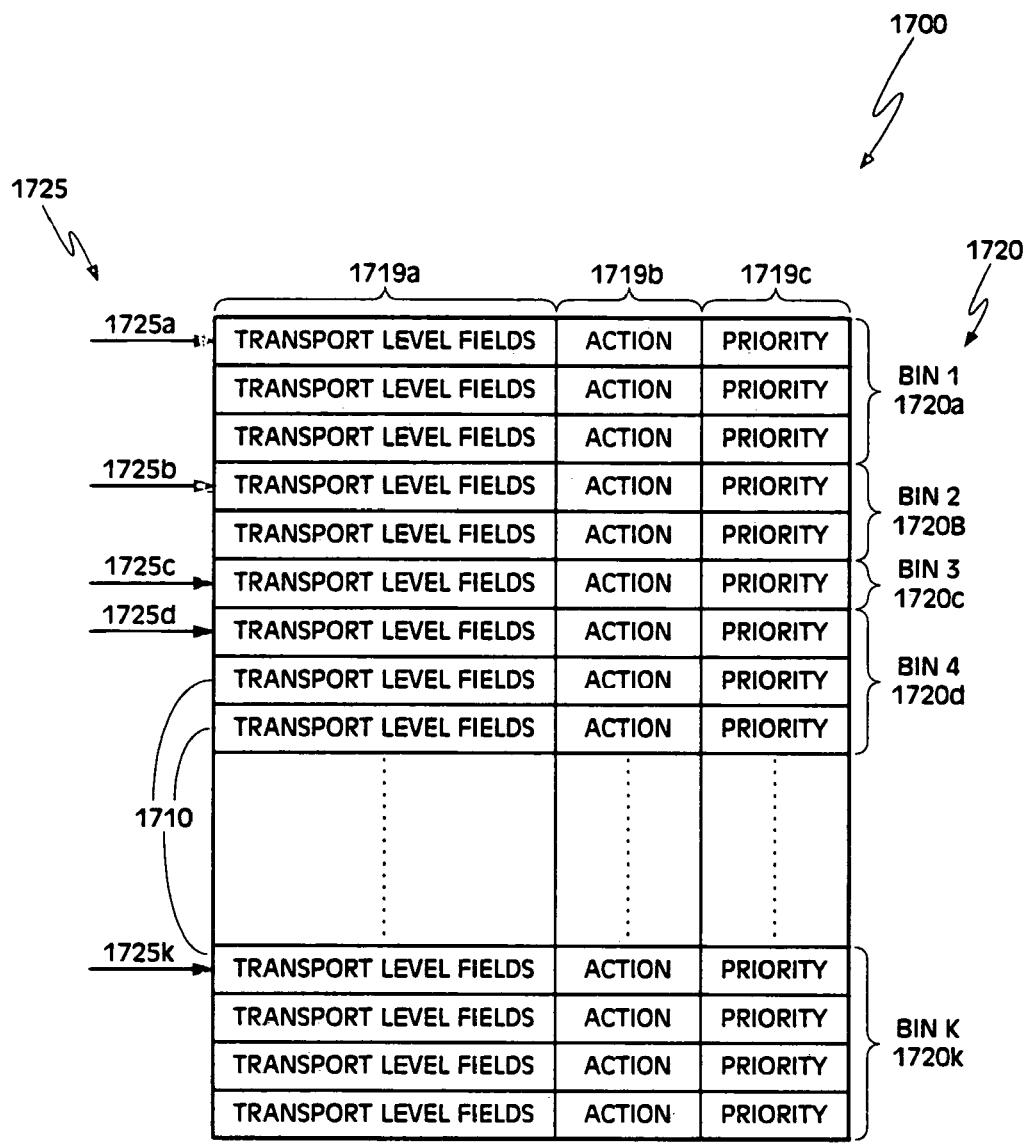
FIG. 17 is a schematic diagram illustrating an embodiment of a second classification stage data structure.

We now turn our attention to the second stage data structure 1700, an embodiment of which is illustrated in FIG. 17. Construction of the second stage data structure 1700 is guided by a number of the concepts discussed above. First and most important, transport level sharing allows multiple entries in the first stage data structure to share groups of various sets of transport level fields or, more precisely, a group of triplets, wherein each triplet includes one or more transport level fields, an action, and a relative priority (i.e., a relative priority within a rule set, as distinguished from a rule's absolute priority). Thus, each group of triplets—i.e., each small bin—need only be stored one time. Secondly, although the union of two or more small bins associated with a filter intersection is logically thought of as a large bin, the large bins do not have to be stored, as the primary and secondary tables 1630, 1640a-b of the first stage data structure 1600 include pointers to all small bins associated with an entry. Again, in another embodiment, large bins may be stored. Through transport level sharing, the second stage data structure 1700 simply becomes a list of triplets organized into small bins, and because of the reduction in entries provided by transport level sharing, the memory storage requirements for the second stage data structure 1700 are relatively small in comparison to other classification techniques.

Referring to FIG. 17, the second stage data structure 1700 includes a number of triplets 1710, each triplet 1710 including one or more transport level (or other) fields 1719*a*, an action 1719*b*, and a relative priority 1719*c*. Each triplet 1710 is associated with a small bin 1720 (i.e., one of the small bins 1720*a*, 1720*b*, . . . , 1720*k*). Small bins 1720*a-k* comprise groups of triplets 1710, and the memory location where a small bin is stored may be identified by a corresponding pointer 1725 (i.e., small bin 1720*a* is identified by a corresponding pointer 1725*a*, small bin 1720*b* is identified by a corresponding pointer 1725*b*, and so on). As previously described, the bin pointers 1725*a-k* are stored in the forwarding table 1602 (see FIG. 16A). When the pointer 1725 associated with a small bin 1720 (or a large bin, if large bins are stored) is identified in a query on the first stage data structure 1600, all triplets in the corresponding small bin 1720 are compared against the received packet. If at least one match is found, the action associated with the matching triplet may be applied to the received packet. In one embodiment, this action has the highest priority that has been encountered.

In one embodiment, the second stage data structure 1700 is implemented in a content addressable memory (CAM), such as a ternary CAM. In this embodiment, the CAM may include a number of entries, each entry associated with one of the triplets 1710 of second stage data structure 1700. In a further embodiment, where the second stage data structure 1700 is implemented in a CAM, a number of the CAM's entries (e.g., the triplets 1710 associated with one or more small bins 1720) may be searched in parallel.

Figure 18:
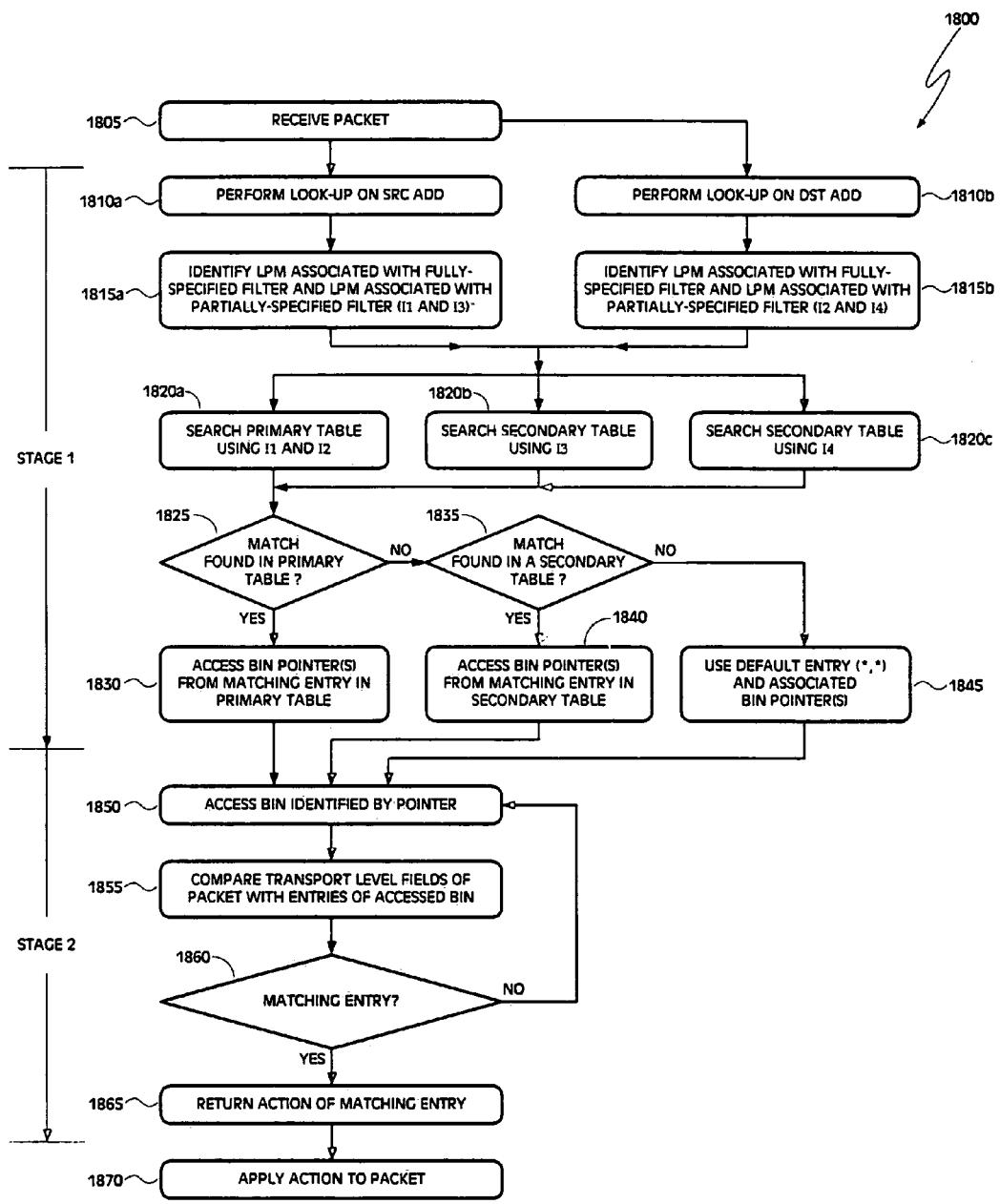
FIG. 18 is a block diagram illustrating an embodiment of a method for two-stage packet classification using most specific filter matching and transport level sharing.

Referring now to FIG. 18, illustrated is an embodiment of a method of classifying a packet, as may be performed using the two-stage packet classifier illustrated in FIGS. 1 through 17 and the accompanying text above. Referring to block 1805 in this figure, a packet is received. As set forth at blocks 1810*a* and 1810*b*, a look-up is performed on the source address and on the destination address (see FIG. 14, items 1410, 1420 and FIG. 16A, items 1610, 1620). In one embodiment, as shown in FIG. 18, the queries on the source and destination addresses are performed in parallel. However, it should be understood that, in other embodiments, these queries may not be done in parallel. Based on the source address query, the longest prefix match (LPM) associated with a fully specified filter and the LPM associated with a partially specified filter are identified, which is shown at block 1815*a*. An index I1 associated with the matching fully specified filter and an index I3 associated with the matching partially specified filter are returned (see FIG. 16B, items 1691, 1693). Similarly, from the query on the destination address, the longest LPM associated with a fully specified filter and the LPM associated with a partially specified filter are identified—see block 1815*b*—and an index I2 associated with the matching fully specified filter as well as an index I4 associated with the matching partially specified filter are returned (see FIG. 16B, items 1692, 1694).

The two indexes I1 and I2 associated with the matching fully specified filters are then combined (e.g., concatenated) to form a key (see FIG. 16B, item 1690), and this key is used to search the primary table (see FIGS. 16A and 16C, item 1630), as set forth in block 1820*a*. Referring to blocks 1820*b* and 1820*c*, the index I3 is used to search one of the secondary tables, whereas the index I4 is used to search the other secondary table (see FIG. 16A, items 1640*a*, 1640*b*). Again, the primary table 1630 includes all fully specified filters and fully specified filter intersections, as well as all non-existent filters that cannot be aggregated with other filters (i.e., indicator filters). One of the secondary tables 1640*a*, 1640*b* includes partially specified filters having the wildcard in the source address, and the other of the secondary tables includes partially specified filters having the wildcard in the destination address, but no indicator filters are included in the secondary tables. In one embodiment, the searches on the primary and secondary tables 1630, 1640*a-b* are performed in parallel, as shown in FIG. 18. In other embodiments, however, these searches may not be done on parallel.

Referring to block 1825, the key (formed from I1 and I2) is compared with the key 1637*a* in each entry 1632 of the primary table 1630 (see FIG. 16C). If a match is found, the bin pointers (or pointer) 1637*b* in the matching entry are accessed, as set forth in block 1830. The key formed from I1 and I2 may be used to search the primary table in a variety of ways. For example, in one embodiment, a hash function is applied to the key, and the hash is used to search the primary table 1630, which is implemented as a hash table.

When a match is found in the primary table 1630, the secondary tables 1640*a-b* are ignored. If a match is not found in the primary table, and a match is found in one of the secondary tables—see block 1835—the bin pointer(s) in the matching entry of that secondary table are accessed, which is shown at block 1840. Note that only one of the secondary tables will have a matching entry (if, indeed, a match is found in the secondary tables). If, however, no match is found in the primary table or either one of the secondary tables, a default entry corresponding to the entire two-dimensional address space is used, and this entry's associated bin pointers are accessed, as set forth at block 1845. At this juncture, the received packet has been classified on the basis of its network path, and the process moves to the second stage of classification.

Referring now to block 1850, a small bin (or, in some embodiments; a large bin) identified by one of the bin pointers is accessed. The transport level fields of the received packet are compared against each entry of the accessed bin (see FIG. 17) to determine whether there is a matching entry in the accessed bin, a set forth in block 1855. If the accessed bin includes a matching entry—see block 1860—the action associated with the matching entry is returned, as set forth in block 1865. Referring to block 1870, the returned action may then be applied to the packet.

As described above, an entry in the primary table or one of the secondary tables may include multiple pointers, each pointer identifying a small bin (i.e., in other words, the entry is associated with a large bin). Thus, after considering all entries in the accessed bin (see block 1855), if a matching entry has not been identified (see block 1860), the process will then look to any other bin pointers (and bins) that have not yet been considered (see block 1850). If there are additional bins to query, the above-described process for accessing a small bin is repeated (i.e., blocks 1850, 1855, and 1860). Thus, so long as there are bin pointers remaining that have not been accessed, the process for accessing and searching a small bin is repeated until a match is found.

Figure 19:
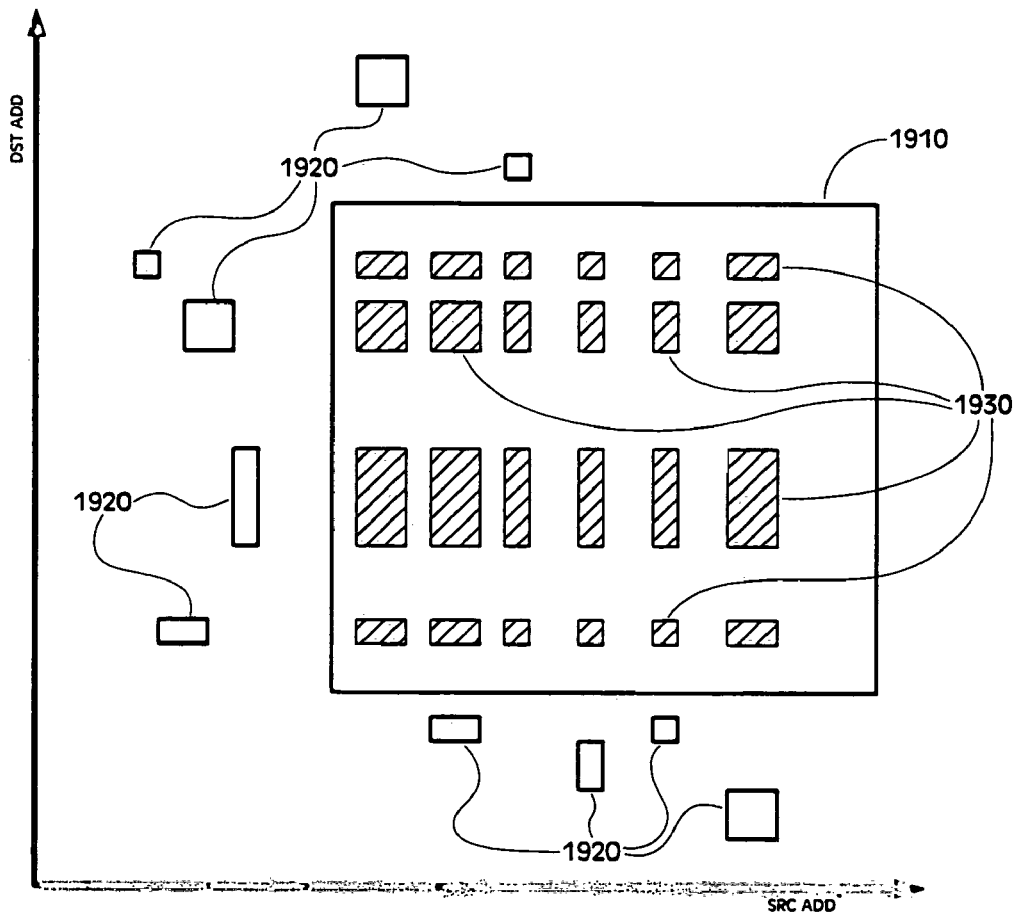
FIG. 19 is a schematic diagram illustrating an embodiment of a filter database including a wide filter.

Returning at this time to FIG. 15, as earlier described, regions such as R2 that cannot be aggregated with other filters—i.e., "indicator filters"—are added to the primary table 1630 (although none are placed in the secondary tables 1640*a-b*). A fully specified filter or filter intersection may contain numerous indicator filters. This is illustrated in FIG. 19, which shows a fully specified filter (or filter intersection)

1910 and a number of other "narrower" fully specified filters (or filter intersections) 1920. Combining the source address of one fully specified narrow filter 1920 with the destination address of another narrow filter 1920—again, a result that occurs because, as discussed above, the queries on the source address and destination address look-up tables are performed independently—produces a number of non-existent filters 1930 that are fully contained in filter 1910 and, therefore, cannot be aggregated with another filter. Thus, these indicator filters 1930 will, in one embodiment, be placed in the primary table 1630. In yet another embodiment, however, an upper bound is placed on the number of indicator filters associated with any given fully specified filter. For any fully specified filter or filter intersection that exceeds this specified upper bound of indicator filters, the filter and its associated indicator filters are not placed in the primary table 1630. A filter, such as fully specified filter 1910 in FIG. 19, encompassing a relatively large number of indicator filters that exceeds the specified upper bound may be referred to as a "wide" filter, as such a filter typically spans a wide range of source and destination addresses.

Figure 20A:
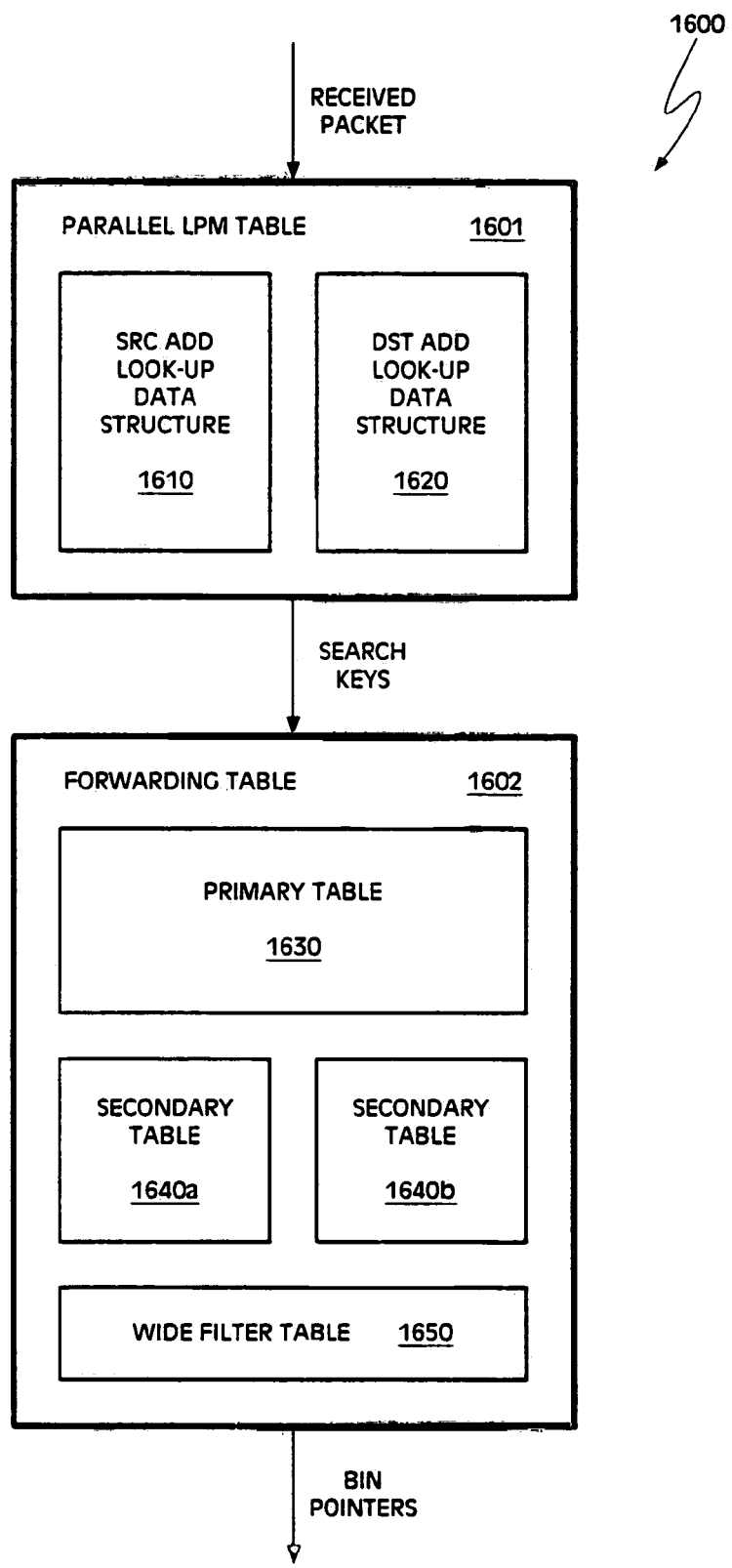
FIG. 20A is a schematic diagram illustrating another embodiment of the first classification stage data structure.
Figure 20B:
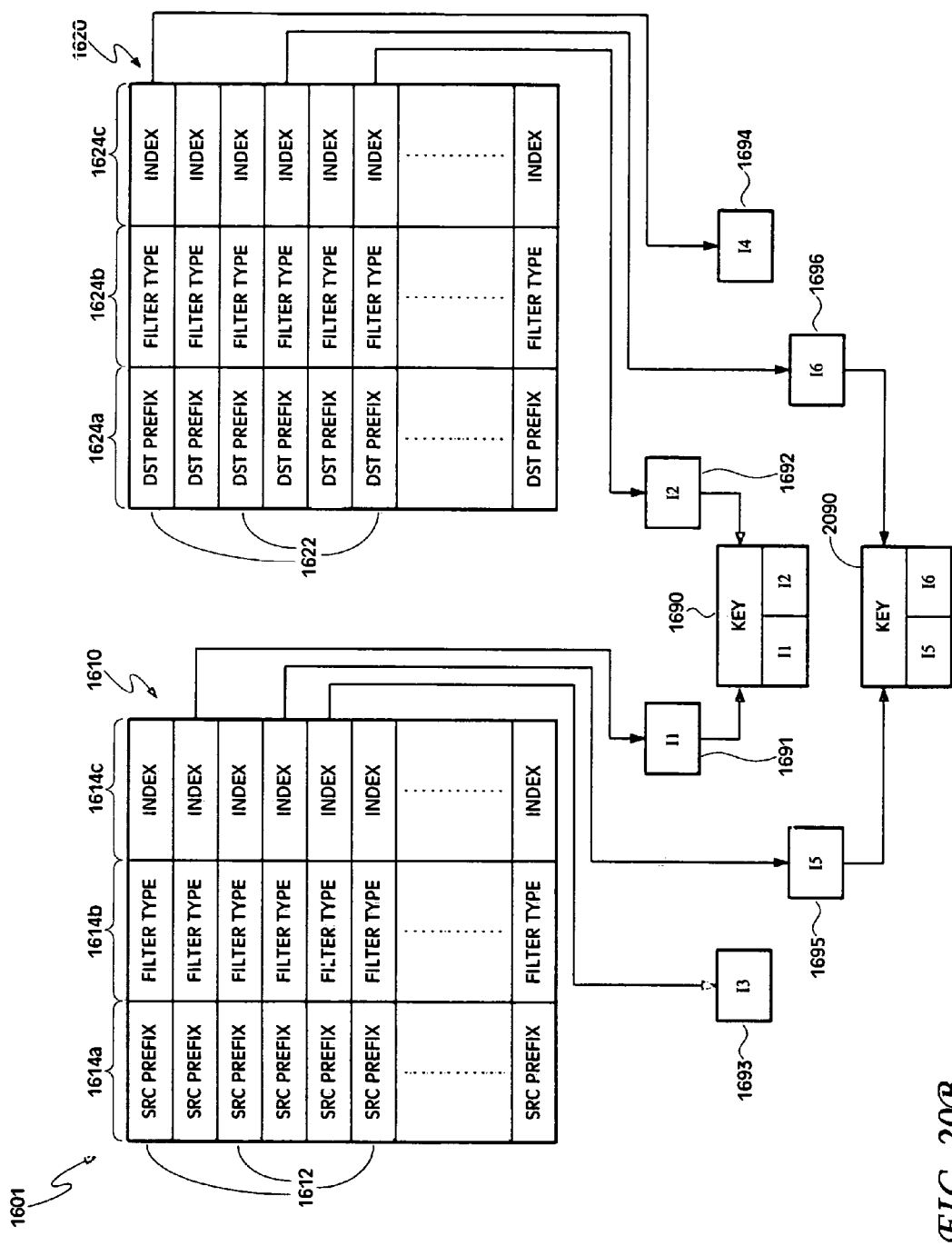
FIG. 20B is a schematic diagram illustrating another embodiment of a parallel longest prefix match look-up table.
Figure 20C:
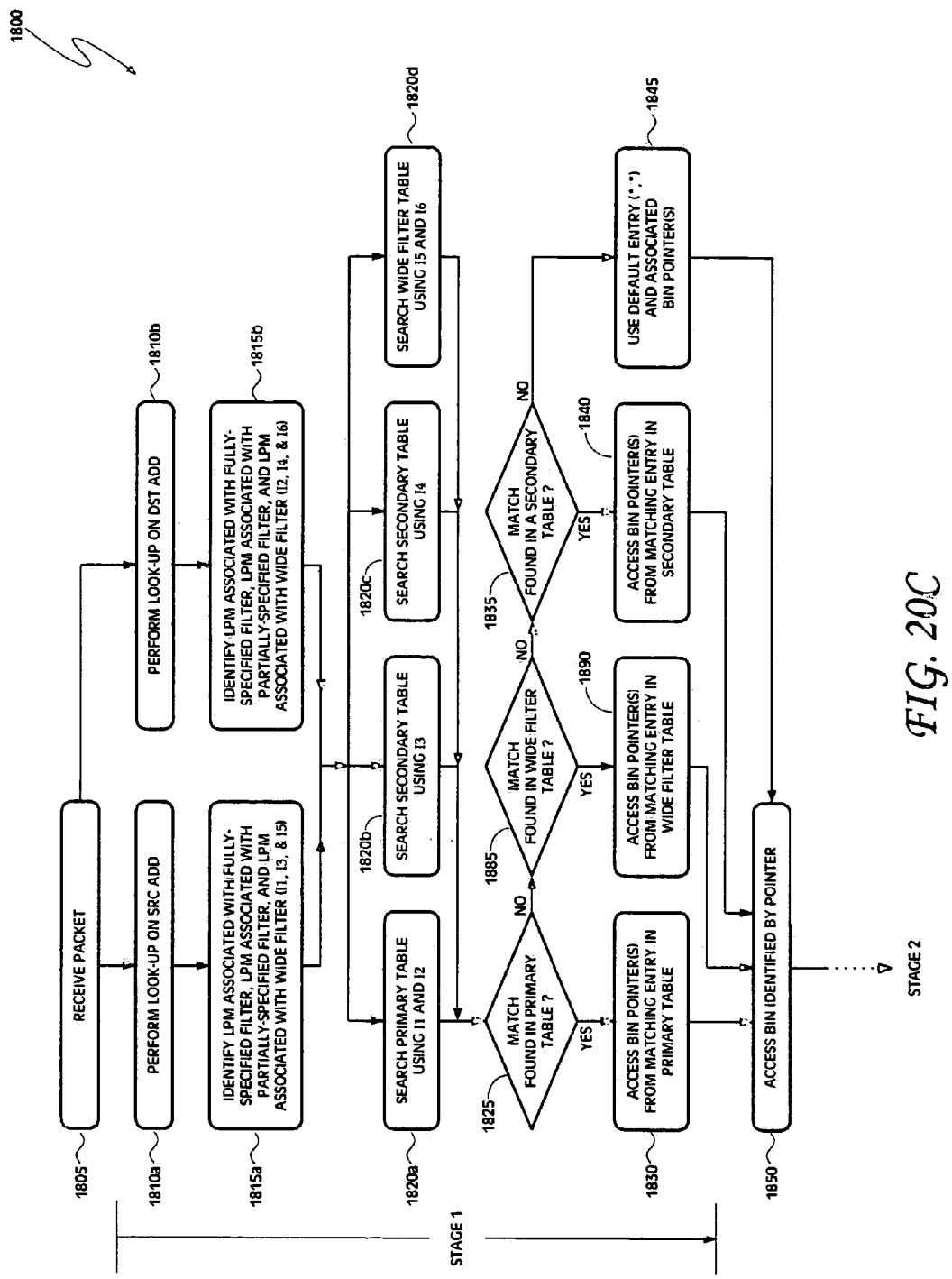
FIG. 20C is a block diagram illustrating another embodiment of a method for two-stage packet classification using most specific filter matching and transport level sharing.

The above-described embodiment is further illustrated in FIGS. 20A through 20C. It should be noted that FIGS. 20A, 20B, and 20C are similar to FIGS. 16A, 16B, and 18, respectively, and like elements have retained the same numerical designation in each of FIGS. 20A-20C. Also, a description of elements previously described above is not repeated for some elements in the following text.

Referring first to FIG. 20A, those filters that exceed the specified bound of indicator filters—i.e., the wide filters—are placed in a separate data structure, which is referred to herein as the wide filter table 1650. The wide filter table 1650 includes an entry for each wide filter. In one embodiment, the wide filter table 1650 comprises a data structure similar to a cross-producting table (e.g., see FIGS. 15 and 19). It is expected that, for most real-classification databases, the number of wide filters will be small. However, because a wide filter can potentially create a large number of entries in the primary table 1630, removing these wide filters to a separate data structure (that can be searched in parallel with the primary and secondary tables) can significantly improve the efficiency of the classification process.

Referring next to FIG. 20B, during the first stage of classification, four different indexes 1691, 1692, 1693, 1694 (I1 through I4) are returned from the queries on the source and destination address tables 1610, 1620, respectively, as previously described. The first and second indexes 1691, 1692 correspond to the matching source and destination prefixes associated with fully specified filters, whereas the third and fourth indexes 1693, 1694 correspond to the matching source and destination prefixes associated with partially specified filters, as was also described above. In the present embodiment, which accounts for wide filters, the queries on the source and destination address tables 1610, 1620 also return a fifth index 1695 (I5) and a sixth index 1696 (I6). The fifth index 1695 corresponds to the matching source prefix associated with a wide filter, and the sixth index 1696 corresponds to the matching destination prefix associated with a wide filter. Note that, in each of the source address table 1610 and the destination address table 1620, the filter type designation 1614b, 1624b now indicates whether that entry is associated with a fully specified filter, a partially specified filter, or a wide filter. The fifth index 1695 and the sixth index 1696 (I5 and I6) are then combined to form a key 2090 that is used to query the wide filter table 1650, as will be described below.

Illustrated in FIG. 20C is another embodiment of the method 1800 for two-stage packet classification. The embodiment shown in FIG. 20C proceeds in much the same manner as the embodiment previously described with respect to FIG. 18. However, the method shown in FIG. 20C accounts for wide filters, and this embodiment utilizes the wide filter table 1650 and the fifth and sixth wide filter indexes 1695, 1696, as described above.

Turning to FIG. 20C, a packet is received (see block 1805), and a look-up is performed on the source and destination addresses, as set forth at blocks 1810a, 1810b. Based on the source address query, the longest prefix match (LPM) associated with a fully specified filter, the LPM associated with a partially specified filter, and the LPM associated with a wide filter are identified, and the indexes I1, I3, and I5 are returned (see FIG. 20B, items 1691, 1693, 1695), as shown at block 1815a. Again, I1 is associated with the matching fully specified filter, I3 is associated with the matching partially specified filter, and I5 is associated with the matching wide filter. Similarly, from the query on the destination address, the longest LPM associated with a fully specified filter, the LPM associated with a partially specified filter, and the LPM associated with a wide filter are identified—see block 1815b—and an index I2 associated with the matching fully specified filter, an index I4 associated with the matching partially specified filter, as well as an index I6 associated with the matching wide filter are returned (see FIG. 20B, items 1692, 1694, 1696).

As previously described, the two indexes I1 and I2 associated with the matching fully specified filters are then combined to form a key that is used to search the primary table, and the indexes I3 and I4 are used to search the secondary tables, as set forth at blocks 1820a, 1820b, and 1820c. In addition, the indexes I5 and I6 are combined to form a key (see FIG. 20B, item 2090), and this key is used for a query on the wide filter table 1650, which is set forth in block 1820d. In one embodiment, the searches on the primary table 1630, secondary tables 1640a-b, and wide filter table 1650 are performed in parallel, as shown in FIG. 20B. In other embodiment, however, these searches may not be done on parallel.

Referring to block 1825, the key (formed from I1 and I2) is compared with the key 1637a in each entry 1632 of the primary table 1630 (see FIG. 16C), and if a match is found, the bin pointers (or pointer) 1637b in the matching entry are accessed, as set forth in block 1830. In this embodiment, however, if a match is not found in the primary table, the process turns to the wide filter table—see block 1885—and the key (formed from I5 and I6) is compared with each entry in the wide filter table. If a match is found in the wide filter table, the bin pointers in the matching entry of the wide filter table are accessed, as shown in block 1890. If a match is not found in either of the primary table and the wide table, and a match is found in one of the secondary tables—see block 1835—the bin pointer(s) in the matching entry of that secondary table are accessed, as set forth at block 1840. If no match is found in the primary table, the wide filter table, or either one of the secondary tables, a default entry corresponding to the entire two-dimensional address space is used, and this entry's associated bin pointers are accessed, as set forth at block 1845. If a match is found in the primary table 1630, the other tables are ignored, and where no match occurs in the primary table and a match is found in the wide filter table 1650, the secondary tables 1640a-b are ignored. Classification on the basis of the received packet's network path is complete, and the process moves to the second stage of classification. Note that, in FIG. 20C, the second stage of packet classification is not shown, because the second stage would proceed in a manner as previously described.

Figure 21:
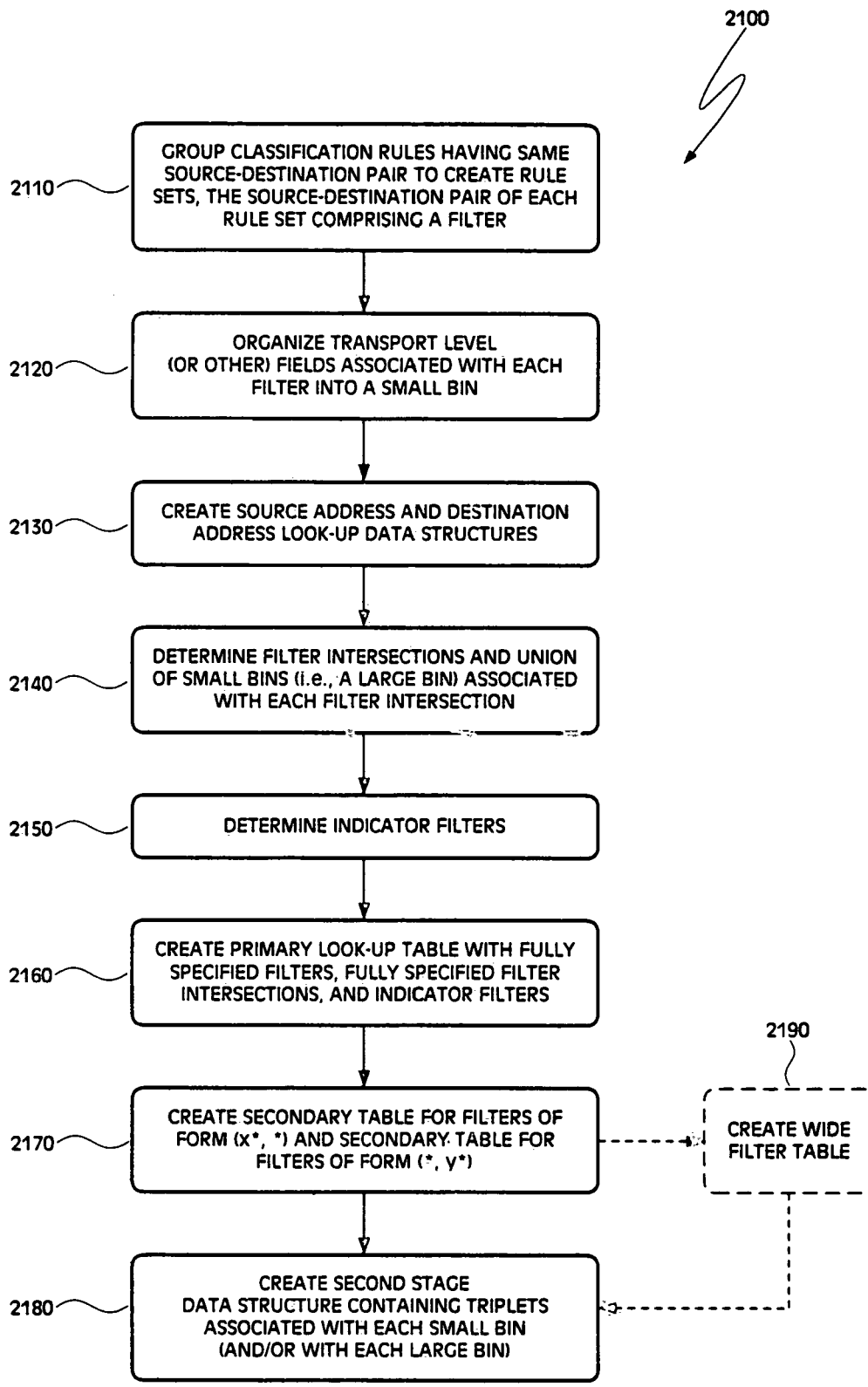
FIG. 21 is a block diagram illustrating an embodiment of a method for creating and/or updating a two-stage classification data structure.

We now turn our attention to embodiments of a method for creating and/or updating the first and second stage data structures. Referring to FIG. 21, illustrated are embodiments of a method 2100 for creating and/or updating the data structures used for the two-stage packet classification process described above. It should be noted that the process described in FIG. 21 comprises a set of preprocessing operations performed prior to (or, in one embodiment, during) packet classification. However, creating and/or updating the data structures (e.g., the first and second stage data structures 1600, 1700) needed for the disclosed two-stage packet classification scheme would be performed infrequently in comparison to the process of classifying a packet. Thus, the bulk of processing needed to carry out the disclosed classification technique is heavily front-loaded to a series of preprocessing operations that need to be performed relatively infrequently.

With reference now to block 2110 in FIG. 21, the rules of the classification database (see FIG. 10) are grouped into rule sets, wherein the rules in each rule set have the same source and destination addresses (see FIGS. 11A and 11B). In one embodiment, the rules of a rule set occupy consecutive priority levels, whereas in another embodiment, the rules of a rule set do not occupy adjacent priority levels, as noted above. The source-destination pair associated with each rule set is referred to as a filter, as noted above. As set forth at block 2120, the sets of transport level (or other) fields, as well as the corresponding action and relative priority, associated with each filter are organized into a small bin.

Referring to block 2130, the source address look-up data structure and destination address look-up data structure, which are to be used for the parallel LPM queries on the source and destination addresses of a received packet, are created (see FIGS. 16A and 16B, item 1601). The source address look-up data structure includes an entry for each filter in the database, the entry for each filter including a source prefix, a filter type designation (e.g., whether fully specified, partially specified, or wide), and an index. Similarly, the destination address look-up data structure includes an entry for each database filter, wherein each entry includes a destination prefix for that filter, a filter type designation, and an index.

To complete the first stage data structure, the forwarding table is constructed (see FIG. 16A, item 1602). Filter intersections are determined (see FIGS. 12A-12C), and the union of small bins associated with each filter intersection—i.e., a large bin—is found (see FIG. 11B), as set forth at block 2140. Indicator filters are also determined, as set forth in block 2150. As noted above, indicator filters are those non-existent filters that cannot be aggregated with another filter (see FIG. 15 and accompanying text). Fully specified filters, fully specified filter intersections, and indicator filters are then placed in the primary table (see FIGS. 16A and 16C), which is set forth at block 2160. Again, in one embodiment, completely overlapping filter intersections (see FIGS. 13A-13C) are not placed in the primary table. Referring to block 2170, the secondary tables are created, one secondary table including partially specified filters of the form "X*, *" and the other of the secondary tables including partially specified filters of the form "*, Y*". In an alternative embodiment, wide filters—e.g., those filters having a number of indicator filters exceeding a specified threshold (see FIG. 19)—are placed in another table—i.e., a wide filter table (see FIG. 20A, item 1650)—which is illustrated by block 2190.

Referring to block 2180, the second stage data structure is created. As previously described, in one embodiment, the second stage data structure contains the set of triplets associated with each small bin (see FIG. 17). The small bins are identified by pointers contained in the primary and secondary tables. In this embodiment, large bins are not stored in the second stage data structure but, rather, large bins are simply identified by a list of pointers (in an entry of a primary or secondary table) to two or more small bins. In an alternative embodiment (where, for example, rule sets comprise rules of non-consecutive priority levels), the group of triplets associated with large bins are stored in memory.

Embodiments of a method for two-stage packet classification using most specific filter matching and transport level sharing—as well as embodiments of data structures that may be used to implement the two-stage classification scheme—having been herein described, those of ordinary skill in the art will appreciate the advantages of the disclosed embodiments. Transport level sharing can significantly reduce the number of triplets that need to be stored, which reduces the memory storage requirements of the disclosed two-stage classification scheme. Also, because of the reduced storage requirements resulting from TLS, the second stage data structure is readily amenable to implementation in content addressable memory (or other hardware architecture). In addition, incorporating most specific filter matching into the first stage of packet classification can reduce the number of memory accesses—as does utilization of TLS—needed to classify a packet. Furthermore, the bulk of data processing required by the disclosed two-stage classification technique is heavily front-loaded to a number of preprocessing operations (e.g., creation of the first and second stage data structures), and such operations are performed relatively infrequently.

The foregoing detailed description and accompanying drawings are only illustrative and not restrictive. They have been provided primarily for a clear and comprehensive understanding of the disclosed embodiments and no unnecessary limitations are to be understood therefrom. Numerous additions, deletions, and modifications to the embodiments described herein, as well as alternative arrangements, may be devised by those skilled in the art without departing from the spirit of the disclosed embodiments and the scope of the appended claims.

What is claimed is:

1. A method comprising:
    receiving a packet, the packet having a header including a source address, a destination address, and a number of other fields;
    identifying, from a number of entries in a data structure, an entry having a source address prefix matching the source address of the packet, the matching entry including a first identifier;
    identifying, from a number of entries in another data structure, an entry having a destination address prefix matching the destination address of the packet, the matching entry including a second identifier;
    identifying, from a number of bins, a bin corresponding to the first and second identifiers, the corresponding bin including a number of sets of transport level fields; and
    comparing at least one of the other fields of the packet header with each set of transport level fields in the corresponding bin to find a matching set of transport level fields.

2. The method of claim 1, further comprising applying to the received packet an action associated with the matching set of transport level fields.

3. The method of claim 1, wherein the number of other fields in the packet header includes at least one of a protocol, a source port, and a destination port.

4. The method of claim 3, wherein the source address of the packet header comprises a source IP (Internet Protocol)

address and the destination address of the packet header comprises a destination IP address.

5. A method comprising:
receiving a packet, the packet having a header including a source address, a destination address, and a number of transport level fields;
searching a source address data structure to find a first index and a third index, the first index associated with a fully specified filter having a source prefix matching the source address of the packet, the third index associated with a partially specified filter having a source prefix matching the source address of the packet;
searching a destination address data structure to find a second index and a fourth index, the second index associated with a fully specified filter having a destination prefix matching the destination address of the packet, the fourth index associated with a partially specified filter having a destination prefix matching the destination address of the packet;
forming a key from the first and second indexes;
searching a primary table for an entry matching the key, the primary table including a number of entries, each entry corresponding to one of a fully specified filter, a fully specified filter intersection, and an indicator filter; and
if a matching entry is found in the primary table, accessing a list of bin pointers associated with the matching entry, each bin pointer of the list identifying a bin containing a number of sets of transport level fields.

6. The method of claim 5, further comprising:
accessing one of the bins identified by one of the bin pointers in the matching entry of the primary table;
comparing the transport level fields of the packet with each set of transport level fields in the accessed bin; and
if the accessed bin has a set of transport level fields matching the transport level fields of the packet, applying an action associated with the matching set of transport level fields to the received packet.

7. The method of claim 5, further comprising:
searching a first of two secondary tables for an entry matching the third index, the first secondary table including a number of entries, each entry corresponding to a partially specified filter;
searching a second of the two secondary tables for an entry matching the fourth index, the second secondary table including a number of entries, each entry corresponding to a partially specified filter; and
if no match is found in the primary table and a matching entry is found in one of the two secondary tables, accessing a list of bin pointers associated with the matching entry, each bin pointer of the list identifying a bin containing a number of sets of transport level fields.

8. The method of claim 7, further comprising:
accessing one of the bins identified by one of the bin pointers in the matching entry of the one secondary table;
comparing the transport level fields of the packet with each set of transport level fields in the accessed bin; and
if the accessed bin has a set of transport level fields matching the transport level fields of the packet, applying an action associated with the matching set of transport level fields to the received packet.

9. The method of claim 7, further comprising:
if no match is found in either of the secondary tables, accessing a list of bin pointers associated with a default entry, each bin pointer of the list identifying a bin containing a number of sets of transport level fields.

10. The method of claim 9, wherein the default entry corresponds to an entire two-dimensional address space.

11. The method of claim 5, further comprising
searching the source address data structure to find a fifth index associated with a wide filter having a source prefix matching the source address of the packet;
searching the destination address data structure to find a sixth index associated with a wide filter having a destination prefix matching the destination address of the packet;
forming a second key from the fifth and sixth indexes;
searching a wide filter table for an entry matching the second key, the wide filter table including a number of entries, each entry corresponding to a wide filter; and
if no match is found in the primary table and a matching entry is found in the wide filter table, accessing a list of bin pointers associated with the matching entry in the wide filter table, each bin pointer of the list identifying a bin containing a number of sets of transport level fields.

12. The method of claim 11, further comprising:
accessing one of the bins identified by one of the bin pointers in the matching entry of the wide filter table;
comparing the transport level fields of the packet with each set of transport level fields in the accessed bin; and
if the accessed bin has a set of transport level fields matching the transport level fields of the packet, applying an action associated with the matching set of transport level fields to the received packet.

13. The method of claim 11, wherein each wide filter contained in the wide filter table comprises a fully specified filter having a number of indicator filters exceeding a specified threshold.

14. The method of claim 5, wherein the number of transport level fields in the received packet comprises at least one of a source port, a destination port, and a protocol.

15. An apparatus comprising:
a processing device;
a memory coupled with the processing device, the memory having a first data structure stored therein, the first data structure including
a source address look-up data structure, the source address look-up data structure including a number of entries, each of the entries having a source prefix, a filter type, and an index,
a destination address look-up data structure, the destination address look-up data structure including a number of entries, each of the entries having a destination prefix, a filter type, and an index,
a primary table, the primary table including a number of entries, each of the entries having a key and at least one bin pointer, wherein each of the entries is associated with one of a fully specified filter, a fully specified filter intersection, and an indicator filter, and
two secondary tables, each of the secondary tables including a number of entries, each of the entries having a key and at least one bin pointer, wherein each entry of each of the two secondary tables is associated with a partially specified filter.

16. The apparatus of claim 15, further comprising:
a second memory coupled with the processing device, the second memory having a second data structure stored therein, the second data structure including a plurality of small bins, each small bin including a number of triplets, each triplet having at least one transport level field, an action, and a priority;

wherein each of the bin pointers in the entries of the primary and secondary tables identifies one of the small bins of the second data structure.

17. The apparatus of claim 16, wherein the second memory comprises a content addressable memory.

18. The apparatus of claim 16, wherein the at least one transport level field comprises one of a protocol, a source port, and a destination port.

19. The apparatus of claim 18, wherein the second data structure stored in the second memory includes at least one large bin, the large bin comprising a union of small bins associated with a filter intersection.

20. The apparatus of claim 15, wherein the memory comprises at least one of a SRAM, DRAM, SDRAM, and a DDRDRAM.

21. The apparatus of claim 15, wherein the memory comprises part of the processing device.

22. The apparatus of claim 15, wherein one of the secondary tables is associated with partially specified filters having a source address expanding an entire source address space, and the other of the two secondary tables is associated with partially specified filters having a destination address expanding an entire destination address space.

23. The apparatus of claim 15, wherein the filter type in each of the source address and destination address look-up tables comprises one of a fully specified filter and a partially specified filter.

24. The apparatus of claim 15, wherein the first data structure further comprises a wide filter table, the wide filter table including a number of entries, each of the entries having a key and at least one bin pointer, wherein each entry of the wide filter table is associated with one of a wide filter and an indicator filter.

25. The apparatus of claim 24, wherein the filter type in each of the source address and destination address look-up data structures comprises one of a fully specified filter, a partially specified filter, and a wide filter.

26. The apparatus of claim 15, wherein each source address prefix in the source address look-up data structure comprises a source IP (Internet Protocol) address prefix and each destination address prefix in the destination address look-up data structure comprises a destination IP address prefix.

27. The apparatus of claim 15, wherein the primary table includes entries for a subset of all possible indicator filters.

* * * * *